US012719529B2

(12) United States Patent
Steinbauer et al.

(10) Patent No.: US 12,719,529 B2
(45) **Date of Patent: *Aug. 25, 2026**

(54) APPARATUS AND METHOD FOR NEAR FIELD COMMUNICATION (NFC) READING

(71) Applicant: SkyX IP Holdings I LLC, New York, NY (US)

(72) Inventors: Martin Steinbauer, New York, NY (US); Jeffrey Chagnon, New York, NY (US)

(73) Assignee: SkyX IP Holdings I LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/209,004

(22) Filed: May 15, 2025

(65) Prior Publication Data

US 2025/0350321 A1 Nov. 13, 2025

Related U.S. Application Data

(63) Continuation of application No. 18/912,221, filed on Oct. 10, 2024.

(60) Provisional application No. 63/643,844, filed on May 7, 2024.

(51) Int. Cl.
*H04B 5/79* (2024.01)
*G06F 21/31* (2013.01)

(52) U.S. Cl.
CPC .............. *H04B 5/79* (2024.01); *G06F 21/31* (2013.01)

(58) Field of Classification Search
CPC ................................ H04B 5/79; G06F 21/31
See application file for complete search history.

(56) References Cited

U.S. PATENT DOCUMENTS

| | | | | |
|---|---|---|---|---|
| 8,499,966 | B2 | 8/2013 | Palmer et al. | |
| 8,567,639 | B2 | 10/2013 | Kim | |
| 8,905,964 | B2 | 12/2014 | Poutiatine et al. | |
| 8,907,794 | B2 | 12/2014 | Estevez et al. | |
| 9,963,930 | B1 | 5/2018 | Reisender | |
| 11,805,812 | B1 | 11/2023 | Nekos | |
| 12,016,398 | B2 * | 6/2024 | Daugherty | A24F 40/65 |
| 12,063,976 | B2 | 8/2024 | Naeckel et al. | |

(Continued)

OTHER PUBLICATIONS

International Search Report of PCT/US2025/028132 dated Jul. 21, 2025.

(Continued)

*Primary Examiner* — David Bilodeau
(74) *Attorney, Agent, or Firm* — POLSINELLI PC

(57) ABSTRACT

An apparatus for near field communication (NFC) reading includes an outer body and a power source disposed within the outer body, wherein the power source is configured to provide electric power. The apparatus also includes a processing circuit connected to the power source to provide power to the processing circuit, wherein the processing circuit is configured to receive identification data from an external device, transmit the identification data to a remote server communicatively connected to the apparatus, and generate an external response for the external device based on the identification data. Further, the apparatus includes a display communicatively connected to the processing circuit, wherein the display is configured to information from processing circuit.

20 Claims, 16 Drawing Sheets

(56) References Cited

U.S. PATENT DOCUMENTS

2002/0175238 A1 11/2002 Hatano et al.
2004/0129587 A1 7/2004 Lax et al.
2007/0168623 A1 7/2007 Amtmann
2009/0071969 A1 3/2009 Lopez
2012/0238206 A1* 9/2012 Singh .................. G06F 21/6209 455/41.1
2012/0322369 A1* 12/2012 Khan ....................... H04B 5/72 455/41.1
2013/0284192 A1 10/2013 Peleg et al.
2013/0327327 A1 12/2013 Edwards et al.
2014/0339249 A1 11/2014 Reddy et al.
2015/0013398 A1 1/2015 Taylor et al.
2015/0310186 A1 10/2015 Conley et al.
2016/0107820 A1 4/2016 MacVittie et al.
2016/0211693 A1 7/2016 Stevens et al.
2017/0076082 A1 3/2017 Arber
2017/0126267 A1* 5/2017 Park ..................... H04B 1/3888
2017/0193191 A1 7/2017 Blum et al.
2019/0021955 A1 1/2019 Omura
2019/0062038 A1 2/2019 Wilson et al.
2019/0158938 A1 5/2019 Bowen et al.
2020/0000143 A1* 1/2020 Anderson ............... A24F 40/65
2021/0011446 A1* 1/2021 Anderson ............... G06F 21/35
2021/0054653 A1 2/2021 Bloom et al.
2021/0100285 A1 4/2021 Spencer
2021/0350374 A1* 11/2021 Keen ....................... G06F 21/31
2022/0071299 A1* 3/2022 Patel ....................... G07F 11/00
2022/0138882 A1 5/2022 Yocam
2023/0080576 A1 3/2023 Businelle et al.
2023/0180826 A1 6/2023 Murison et al.
2024/0140685 A1 5/2024 Steinbauer et al.
2024/0398026 A1* 12/2024 Stump ..................... A24F 40/50

OTHER PUBLICATIONS

International Search Report of PCT/US2025/028486 dated Jul. 25, 2025.

Non-Final Office Action for U.S. Appl. No. 19/209,004, issued Aug. 14, 2025 (11 pages).

International Search Report of PCT/US25/34289 dated Aug. 5, 2025.

Non-Final Office Action for U.S. Appl. No. 19/206,297, issued Jul. 16, 2025 (10 pages).

Non-Final Office Action for U.S. Appl. No. 18/965,793, issued Mar. 14, 2025 (9 pages).

Non-Final Office Action for U.S. Appl. No. 18/965,564, issued Feb. 3, 2025 (8 pages).

Non-Final Office Action for U.S. Appl. No. 18/965,428, issued Mar. 28, 2025 (10 pages).

Final Office Action for U.S. Appl. No. 18/965,428, issued May 2, 2025 (10 pages).

Non-Final Office Action for U.S. Appl. No. 18/965,297, issued Feb. 13, 2025 (8 pages).

Final Office Action for U.S. Appl. No. 18/965,297, issued May 22, 2025 (22 pages).

Non-Final Office Action for U.S. Appl. No. 18/965,146, issued Jul. 16, 2025 (16 pages).

* cited by examiner

400

300

800

700

FIG. 17
1700
S Λ
V E
Ready for recycling
$0.10 Cashback

APPARATUS AND METHOD FOR NEAR FIELD COMMUNICATION (NFC) READING

CROSS-REFERENCE TO RELATED APPLICATIONS

This application is a continuation of U.S. application Ser. No. 18/912,221 filed Oct. 10, 2024, and titled "APPARATUS AND METHOD FOR NEAR FIELD COMMUNICATION (NFC) READING," which claims the benefit of U.S. Provisional patent application Ser. No. 63/643,844, filed on May 7, 2024, and titled "APPARATUS AND METHOD FOR NEAR FIELD COMMUNICATION (NFC) READING," both of which is incorporated by reference herein in its entirety.

FIELD OF THE INVENTION

The present invention generally relates to the field of near field communications. In particular, the present invention is directed to apparatuses and methods for near field communication (NFC) reading.

BACKGROUND

Although many methods of reading object information exist ranging from electrical, optical, radio frequency, magnetic, audio, memory, and the like, they are either inefficient or expensive to implement for age-gating, unlocking products for authenticated users, product tracing, product authentication, product recalling, sales report generation, theft prevention, regulatory compliance, consumer engagement, and the like. Existing solutions to this problem are not sufficient.

SUMMARY OF THE DISCLOSURE

In an aspect, an apparatus for near field communication (NFC) reading includes an outer body and a power source disposed within the outer body, wherein the power source is configured to provide electric power. The apparatus also includes a processing circuit connected to the power source to provide power to the processing circuit, wherein the processing circuit is configured to receive identification data from an external device, transmit the identification data to a remote server communicatively connected to the apparatus, and generate an external response for the external device based on the identification data. Further, the apparatus includes a display communicatively connected to the processing circuit, wherein the display is configured to information from processing circuit. In another embodiment, the apparatus may include a camera to read a date of birth on an ID or a QR code on an identification app on a user's cell phone, before allowing the unlocking of an external device.

In another aspect, method for near field communication (NFC) reading includes receiving, by a processing circuit in an NFC reader comprising an outer body, a power source disposed within the outer body, the processing circuit, and a display, identification data from an external device, transmitting, by the processing circuit, the identification data to a remote server communicatively connected to the apparatus. The method also includes generating, by the processing circuit, an external response for the external device based on the identification data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for near field communication (NFC) reading. In an embodiment, an apparatus for near field communication reading comprises an outer body, a power source, and a processing circuit configured to receive identification data associated with a nicotine delivery device, generate an external response based on the received identification data, modify an internal state of the nicotine delivery device as a function of the external response, and adjust a device usability as a function of the modified internal state. In a further embodiment, the apparatus may also include a camera that can read the date of birth on an ID, the ID itself, or a QR code linked to a digital identity record management system.

Aspects of the present disclosure can be used to perform age restriction on the use of the apparatus. Aspects of the present disclosure can also be used to enforce age verification at retail locations. This is so, at least in part, because the apparatus may communicate with an NFC chip in an aerosol delivery device, nicotine delivery device, oral nicotine dispensing system, and the like to lock and unlock the device. In some embodiments, the apparatus for near field communication (NFC) reading may be communicatively connected to a remote server configured to transmit identification data from the device(s) to the remote server.

Aspects of the present disclosure allow for the apparatus and methods for NFC reading to monitor sales activity at a sales location and determine activity patterns associated with the external devices. Exemplary embodiments illustrating aspects of the present disclosure are described below in the context of several specific examples.

Figure 1:
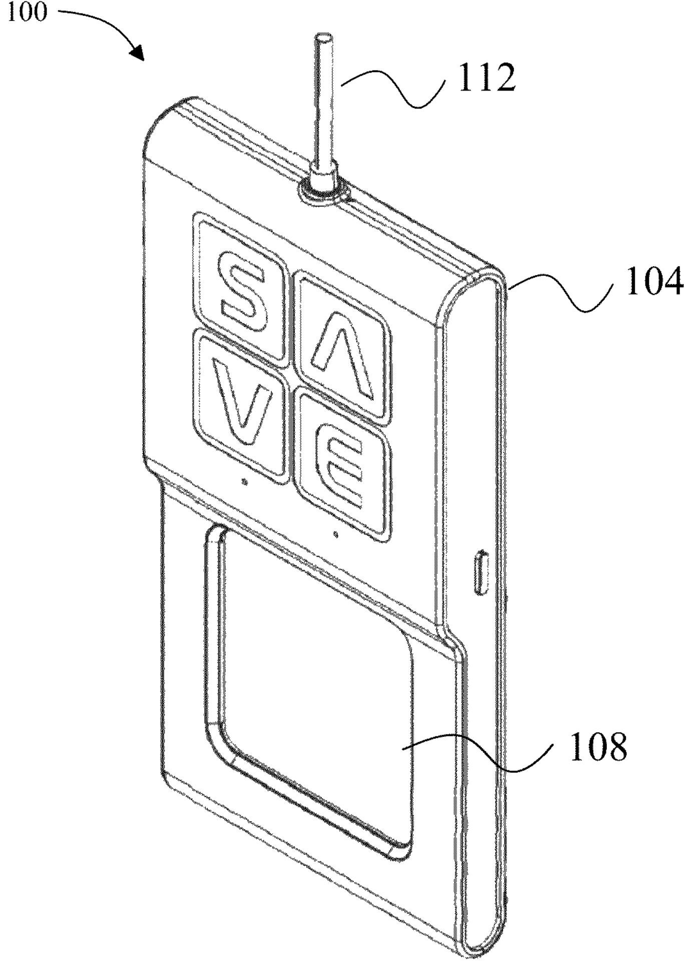
FIG. 1 is a first perspective view of an exemplary embodiment of an apparatus for near field communication (NFC) reading.

Referring now to FIG. 1, an exemplary embodiment of an apparatus 100 for NFC reading is illustrated. As used in this disclosure, an "apparatus for NFC reading" is a device configured to communicate with an NFC chip, for example an NFC chip in an external device, nicotine delivery device, and the like. Apparatus 100 may support a plurality of radio-frequency (RF) protocols such as, without limitation, Zigbee, Bluetooth Low Energy, Wi-Fi, and the like thereof. In some embodiments, apparatus 100 may initiate the communication; for instance, and without limitation, apparatus 100 may send one or more commands to NFC chip within a distance via magnetic field such as, without limitation, configuring external device to send identification data, and/or any processing steps described below in this disclosure. For instance, external device may include any apparatus for aerosol delivery as described in U.S. patent application Ser. No. 18/211,706, filed on Jun. 20, 2023, and entitled "APPARATUS AND METHOD FOR AEROSOL DELIVERY," which its entirety is incorporated herein by reference. In some embodiments, apparatus 100 may be capable of writing data onto NFC chip. In a non-limiting example, apparatus 100 may be used to write generated unique ID onto NFC chip. At a point of sale, apparatus 100 provided to authorized retailers can unlock an external device by placing external device near the reader when age verification is performed. Subsequently, apparatus 100 may save the ID of the device and send the ID to an internal company server. This allows for age verification at the point of sale to be enforced as a company policy. Secondly, this allows for traceability in the supply chain and counterfeit prevention. Further, it allows devices that were sold to minors to be traced back to the retail location and the time of purchase. If this is a consistent pattern of underage usage, this data can be used by the retailer, the company, or the Food and Drug Administration (FDA) to determine if a systemic underage sale problem exists and what action steps are best taken. Additionally, or alternatively, apparatus 100 may include any NFC reader as described in U.S. patent application Ser. No. 18/211,706, filed on Jun. 20, 2023, and entitled "APPARATUS AND METHOD FOR AEROSOL DELIVERY" and in U.S. patent application Ser. No. 18/211,726, filed on Jun. 20, 2023, and entitled "APPARATUS AND METHOD FOR UNIQUE IDENTIFICATION OF AN OBJECT USING NEAR-FIELD COMMUNICATION (NFC)," which their entirety are incorporated herein by reference.

Continuing to refer to FIG. 1, apparatus 100 includes an outer body 104. As used in this disclosure, an "outer body" is a container configured to encapsulate a plurality of internal elements of apparatus 100 such as, without limitation, any elements, components, and/or devices described below in this disclosure. Outer body 104 may be constructed of any suitable material or combination of materials. For instance, and without limitation, outer body 104 may be constructed at least in part of metal, such as without limitation aluminum, steel, or the like. Outer body 104 may be constructed at least in part of plastic, such as without limitation polyvinyl chloride (PVC), high-density polyethylene (HDPE), acrylonitrile butadiene styrene (ABS), or the like. Outer body 104 may be composed at least in part of ceramic. Outer body 104 may be composed at least in part of composite material; as a non-limiting example, outer body 104 may be composed at least in part of fiberglass or hemp fiber. Outer body 104 may be manufactured according to any suitable method or combination of methods, including without limitation casting, molding, subtractive processes such as machining, computer numerical control (CNC) machining, or the like, additive processes such as fused deposition printing, power-binder printing, selective laser sintering, stereolithography, or the like, lamination, coating, finishing, painting, polishing, engraving, anodization, assembly of parts through adhesion, engineering fits, fastening, fusing, or the like, or any combination thereof. Persons skilled in the art, upon reviewing the entirety of this disclosure, will be aware of various materials and/or material components usable to construct outer body 104 or other elements, components, and/or devices of apparatus 100, as well as suitable methods or combinations of methods for manufacturing outer body 104, components of outer body 104, and/or any other elements, components, and/or devices of apparatus 100 as consistent with the instant disclosure.

Continuing to refer to FIG. 1, apparatus 100 includes a display 108; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, display 108 may include a graphical user interface (GUI) configured to display any information from a nicotine delivery device, any computing device, and the like. In a non-limiting example, external device may include a transceiver 112, wherein the transceiver 112 is a component (a combination of transmitter and/or receiver in a single package) configured to transmit, as well as receive, different signals as described herein. In a non-limiting example, communication between apparatus 100 and external devices may include the use of Bluetooth Low Energy (Bluetooth LE, colloquially BLE) as a wireless personal area network technology. Such technologies may be combined with the NFC-enabled technology to receive data, aggregate data, and control settings and systems of external devices such as, without limitation, control circuits, processing circuit, and the like within external devices via a software application (i.e., computer program): for instance, and without limitation, an app, including a plurality of customizable settings of external devices.

Figure 2:
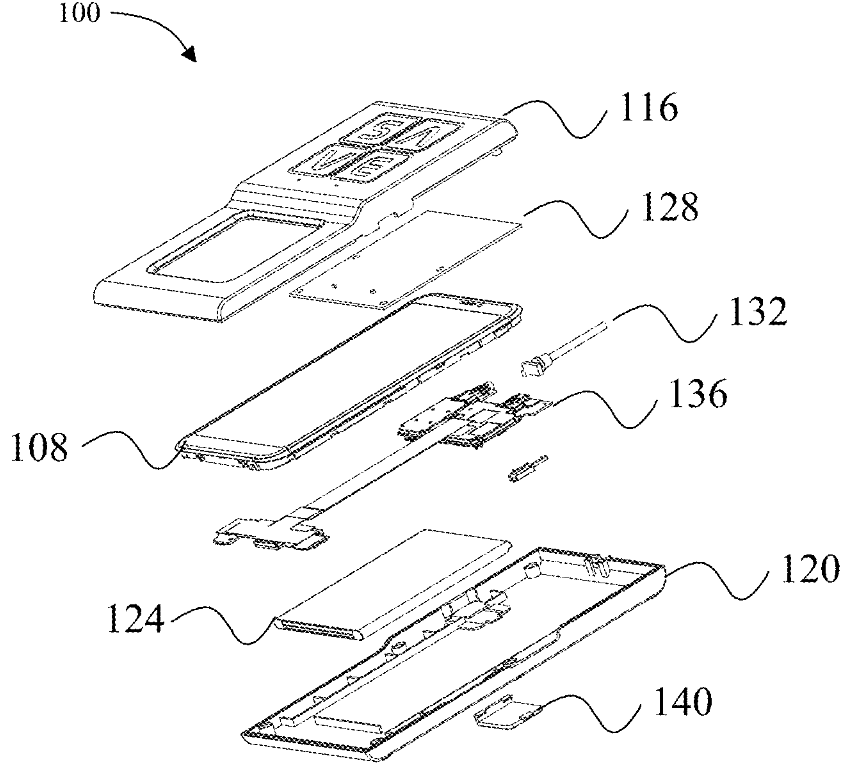
FIG. 2 illustrates an exemplary exploded view of apparatus for NFC reading.
Figure 4:
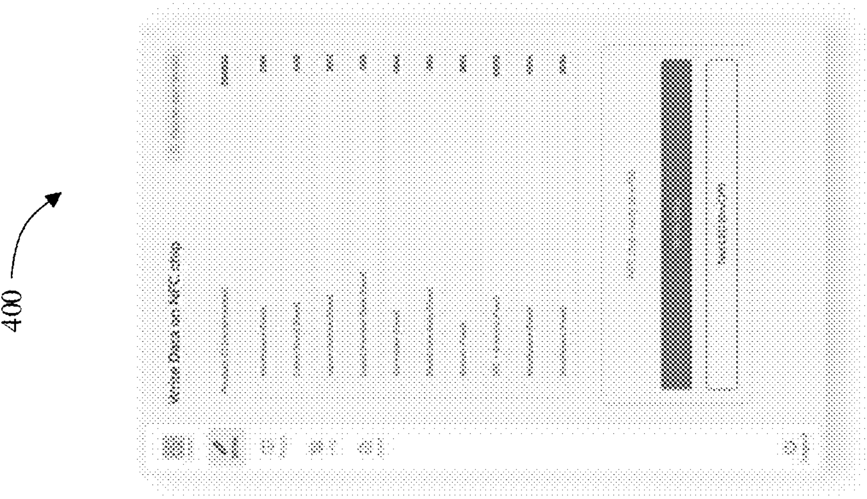
FIG. 4 is a screenshot of a second exemplary embodiment a graphical user interface (GUI) for writing data onto NFC chip.
Figure 3:
FIG. 3 is a screenshot of a first exemplary embodiment a graphical user interface (GUI) for writing data onto NFC chip.
Figure 6:
FIG. 6 is a screenshot of a fourth exemplary embodiment a graphical user interface (GUI) for writing data onto NFC chip.
Figure 5:
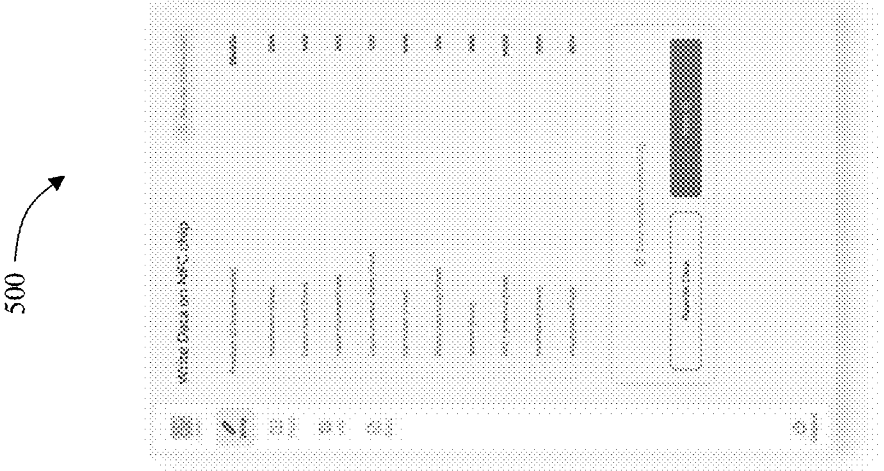
FIG. 5 is a screenshot of a third exemplary embodiment a graphical user interface (GUI) for writing data onto NFC chip.
Figure 8:
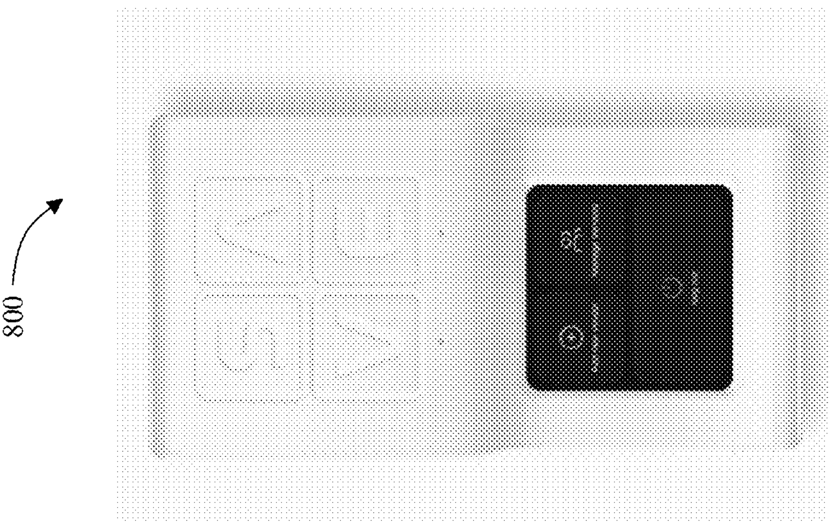
FIG. 8 is an exemplary embodiment of a second display of a GUI during creation of new authorized vendors/point of sale locations.

Referring now to FIG. 2, an exemplary exploded view of apparatus 100 is illustrated. Apparatus 100 includes outer body 104 as described above with FIG. 1. In an embodiment, outer body 104 includes an upper shell cover 116 and a lower shell cover 120. In an embodiment, outer body 104 may be made of plastic, wherein the plastic may include eco-friendly, biodegradable, or otherwise compostable plastic. In a non-limiting example, such plastic may include plant-based plastic such as polylactic acid (PLA), polyhydroalkanoates (PHAs), polyhydroxy butyrate (PHB), Polyhydroxyvalerate (PHV), polyhydroxy hexanoate (PHH), and the like. In another non-limiting example, such plastic may also include petroleum-based plastics such as polyglycolic acid (PGA), polybutylene succinate (PBS). Polycaprolactone (PCL), polybutylene adipate terephthalate (PBAT), Oxo-degradable polypropylene (oxo-PP), and the like.

Still referring to FIG. 2, apparatus 100 includes a power source 124. As used in this disclosure, a "power source" is an element configured to provide electric power to a circuit or device. In some cases, power source 124 may be connected to a plurality of electronic device or components such as, without limitation, display, control circuit, and/or any computing device described below in this disclosure, and the like thereof. Power source 124 may include, without limitation, a battery containing one or more cell chemistries such as, without limitation, lithium cobalt oxide (LCO), lithium nickel cobalt aluminum oxide (NCA), lithium nickel manganese cobalt oxide (NMC), lithium iron phosphate (LFP), and the like; a power source may be rechargeable. In some embodiments, power source 124 may be rechargeable using a charging connector positioned on outer body 104, wherein the charging connector may include any circuit or circuit element by means of which electric power may be transferred from an external power source to power source 124. For instance, and without limitation, charging connector may include an inductive charging coil whereby electrical power is transferred to the inductive charging coil using a varying exterior magnetic field supplied by another device or a conductive connection from the apparatus 100 to an exterior device. A non-limiting example of a conductive connection may include two or more charge contacts, which may be constructed of conductive material and accessible from an exterior surface of outer body 104, such as, without limitation, bottom. Charge contacts may be in electrical communication with power source 124 inside of outer body 104; charge contact pins may be visible on the exterior of outer body 104. When apparatus 100 is connected to an external power source, charging pins may facilitate electrical communication between the power source 124 inside of apparatus 100 and the external power source. Charging pins may be electrically connected to power source 124 via any suitable connection; for instance, and without limitation, charging pins may contact one or more conductive elements including springs, clips, and/or a printed circuit board (PCB). Charging pins may include male and/or female connectors; for instance, charging pins may include a "plug" that projects from bottom of outer body 104 or may include holes into which a plug or one or more projecting conducting pins may be inserted. Additionally, or alternatively, charging connector on bottom may include a magnetic contact. Further, additionally, or alternatively, charging connect may include a charging cable configured to facilitate electrical communication between power source 124 and an external power source.

With further reference to FIG. 2, in some embodiments, power source 124 may be further configured to transmit electric power to elements, components, and/or devices within apparatus 100 which requires electricity to operate, such as, without limitation, control circuit, and/or any computing device described in this disclosure, and the like thereof. In some cases, transmitting electric power may include using one or more continuous conductor. As used in this disclosure, a "continuous conductor" is an electrical conductor, without any interruption, made from electrically conducting material capable of carrying electrical current. Electrically conductive material may include any material that is conductive to electrical current and may include, as a nonlimiting example, various metals such as copper, steel, or aluminum, carbon conducting materials, or any other suitable conductive material. In a non-limiting example, power source 124 may transmit electric power through a continuous conductive wire to control circuit and/or processing circuit. Additionally, or alternatively, power source 124 may be integrated and/or embedded within processing circuit. In a non-limiting example, a power source 124 may be remote to processing circuit and transmit electric power through one or more continuous conductor to control circuit and/or processing circuit over a distance within apparatus 100. In an embodiment, power source 124 may be disposed directly adjacent to the lower shell cover 112 of outer body 104.

With further reference to FIG. 2, apparatus 100 includes an antenna board 128 disposed within outer body 104 of apparatus 100. As used in this disclosure, "antenna board" is circuit board that integrates one or more antennas and the associated electronic components, such as components discussed herein, to facilitate wireless communication. In an embodiment, antenna board 128 may be communicatively connected with power source 124 such that power source 124 is configured to provide power to antenna board 128. Antenna board 128 may include a positive pole and a negative pole, wherein the positive pole may include relatively less electrons (i.e., positive polarity) than the negative pole with negative polarity. Positive pole and negative pole may be connected by a conductive path, such as, without limitation, a wire, wherein the conductive path may include at least power source 108 (not shown) as described above. Wires may be separated onto both sides of power source 108. Wires may be secured to power source using welding, high temperature adhesive tape, and the like. Conductive path may include any components of system circuit described herein. Such connection may allow current to flow from negative pole to positive pole of antenna board. Additionally, or alternatively, apparatus may include an antenna 132 coupled to antenna board 128. Antenna 132 may include any antenna described above such as, without limitation, antenna 132. In a non-limiting example, antenna 132 may include ANT1 and ANT2, wherein the ANT1 may be a 2.4/5 GHz Wi-Fi antenna and the ANT2 may be a 2.4 GHz band antenna which may be used for Wi-Fi, ZigBee, Bluetooth, or RF4CE applications. As persons skilled in the art, upon reviewing the entirety of this disclosure, will be aware of various types of antennas that may be used by antenna board 128 as described in this disclosure. In an embodiment, a magnetic insulator may be disposed in between antenna 132 and power source 108 to shield antennas 132 from aluminum on power source 108.

With continued reference to FIG. 2, apparatus 100 includes a processing circuit 136. As used in this disclosure, a "processing circuit" is a circuit configured to perform processing and/or memory functions. In a non-limiting example, processing circuit 136 may be configured to process any processing steps described in this disclosure. Processing circuit 136 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processing circuit 136 may include a single computing device operating independently, or may include two or more computing device operating in concert, in parallel, sequentially or the like; two or more computing devices may be included together in a single computing device or in two or more computing devices. Processing circuit 136 may interface or communicate with one or more additional devices as described below in further detail via a network interface device. Network interface device may be utilized for connecting processing circuit 136 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processing circuit 136 may include but is not limited to, for example, a computing device or cluster of computing devices in a first location and a second computing device or cluster of computing devices in a second location. Processing circuit 136 may include one or more computing devices dedicated to data storage, security, distribution of traffic for load balancing, and the like. Processing circuit 136 may distribute one or more computing tasks as described below across a plurality of computing devices of computing device, which may operate in parallel, in series, redundantly, or in any other manner used for distribution of tasks or memory between computing devices.

With continued reference to FIG. 2, processing circuit 136 may be designed and/or configured to perform any method, method step, or sequence of method steps in any embodiment described in this disclosure, in any order and with any degree of repetition. For instance, processing circuit 136 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processing circuit 136 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, in an embodiment, apparatus 100 and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 2, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 2, in some embodiments, apparatus 100 and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 2, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 2, embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 2, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 2, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With further reference to FIG. 2, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 2, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 2, embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 2, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 2, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 2, in some embodiments, processing circuit 136 is configured to receive identification data associated with an external device. For example, external device may include any apparatus for aerosol delivery as described in U.S. patent application Ser. No. 18/211,706, filed on Jun. 20, 2023, and entitled "APPARATUS AND METHOD FOR AEROSOL DELIVERY," which its entirety is incorporated herein by reference. As used in this disclosure, "identification data" is data that uniquely identifies external device and/or a user of external device. In a non-limiting example, a first external device may be a first aerosol delivery device may include first identification data associated therewith and a second external device may be a second aerosol delivery device may include second identification data associated therewith, wherein at least a portion of first identification data may be different than at least a portion of second identification data, although both the first aerosol delivery device and the second aerosol delivery device may be manufactured by a same manufacturer. In some embodiments, identification data may include, without limitation, production timestamp, production line serial number, device serial number, device ID, batch number, and the like thereof.

Continuing to refer to FIG. 1, additionally or alternatively, identification data may include user metadata. As used in this disclosure, "user metadata" is data that provides information about user of external device. In some cases, user may include a buyer of apparatus 100 who purchase apparatus 100 from a retailer. In other cases, user metadata may include a retailer who stocks apparatus 100 from a supplier (such as a vendor). In some embodiments, user metadata may be received, collected, or otherwise gathered, by processing circuit 136, from the user at the time of purchasing. User metadata may include, without limitation, purchase timestamp, name, address, email address, date of birth, user identification, driver license number, and the like thereof. In a non-limiting example, user metadata within identification data associated with apparatus 100 may be generated, by processing circuit 136, as a function of the transaction; for instance, and without limitation, user metadata may be collected from payment and/or ID verification during the transaction. Additionally, or alternatively, identification data may be encrypted, by processing circuit 136, in one or more ways described above in reference to the cryptographic system. In a non-limiting example, processing circuit 136 may encrypt identification data into one or more hashes through hash functions as described above.

Still referring to FIG. 2, apparatus 100 may be integrated with a point-of-sale system at a retail location for external devices. For example, the point-of-sale system may be located in a pharmacy, general store, and the like. In an embodiment, point of sale system may be configured to receive user metadata and transmit the user metadata to apparatus 100. User metadata may include a government issued ID, driver's license, passport, and the like. For example, point of sale system may include a barcode scanner, touch screen, biometric sensors, and the like. Additionally, or alternatively, apparatus 100 may be configured to unlock and/or lock a product based on the received user data from the point-of-sale system, described in more detail below. Further, apparatus 100 may be configured to receive sales activity data at a sales location associated with external devices, aggregate the sales activity data, and determine activity patterns associated the point of sale system based on the aggregated data.

With continued reference to FIG. 2, additionally, or alternatively, processing circuit 136 may be configured to receive usage data associated with external device. As used in this disclosure, "usage data" refers to information related to how external device is used by the associated user. In an embodiment, usage data may be used to provide insights into user behavior. In a non-limiting example, usage data may include a puff count, wherein the puff count may indicate number of times the user takes a puff (i.e., user inhalation) from external device. In some cases, puff count may be used to estimate how much aerosolizable material (i.e., e-liquid) is consumed by the user and to track usage of external devices over time. In a non-limiting example, puff count may be used to determine a quantity of active ingredient inhaled by the user. In another non-limiting example, usage data may include a battery usage, wherein the battery usage may indicate how much power from a power source, for example power source 124, is consumed by external device. In a further non-limiting example, usage data may also include a use duration for external device, wherein the use duration may indicate the length of time that the user spends using external device. Usage data may be collected by external device; for instance, and without limitation, external device may be programed to count how long and at what interval or time the battery is activated via an automated tracker, instead of user self-reporting usage or camera filming the user. Automated tracker (e.g., puff counter, battery monitor, temperature sensor, motion sensor, and/or the like) may be integrated on a printed circuit board assembly (PCBA) within external device. As such, duration of each inhalation session, and also the total duration may be calculated and/or recorded (e.g., usage 1, 3 seconds, usage 2, 3.5 seconds, . . . , usage N, 3 seconds) by external device. In some cases, total duration may be calculated without a timestamp; for instance, and without limitation, external device may record at $T_0$, wherein $T_0$ may be a first inhalation session, upon unlocking of external device using apparatus 100 as described below, or at a preprogrammed time running on UTC.

With continued reference to FIG. 2, in some embodiments, processing circuit 136 may include a wireless communication device configured to communicate with external device. As used in this disclosure, a "wireless communication device" is a device that is capable of communicating with other devices without a physical and electrical connection. Communication may include, without limitation, data transfer, signal transmission, and the like thereof. In some embodiments, wireless communication device may be configured to communicate with external device within a communication network. Communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wireless mode of communication. Additionally, or alternatively, wireless communication device may use radio frequency identification (RFID) to communicate with external device, wherein the RFID is a form of wireless communication that incorporates the use of electromagnetic or electrostatic coupling in the radio frequency portion of the electromagnetic spectrum to uniquely identify an object such as, without limitation, external device, nicotine delivery system, and the like. In some embodiments, wireless communication device using RFID may include a transponder, wherein the transponder is a component that configured to respond to different incoming signals. Further wireless communication device using RFID may be operate under different frequency; for instance, wireless communication device may operate at various frequency including, without limitation, low frequency (30 KHz to 500 KHz), high frequency (3 MHz to 30 MHZ), Ultra high frequency (300 MHz to 960 MHz), and the like thereof. RFID may be used by processing circuit to increase a distance of which external devices can be unlocked/locked. Additionally, in an embodiment, RFID may be configured enable unlocking multiple external devices at once. For example, it is possible to remotely unlock multiple refill cartridges outfitted with RFID sold in a single package for the end consumer/user, without having to place the single package on the apparatus to capture data associated with each cartridge. In such an embodiment, a signal specifying which RFID IDs to unlock may be required for the wireless communication device, described herein. The signal may be received from a transaction record linking specific product codes to bar codes from the point of sale terminal. Further, additionally, or alternatively, the signal specifying which RFID IDs to unlock may be encoded on an affixed NFC chip on the outer packaging of the products being sold. For example, an NFC chip may be configured to encode that the package includes 4 cartridges with specific codes, and upon placement of the package NFC chip on the reader, wireless communication device may be configured to unlock the 4 cartridges while the customer and/or user is still in the store. The above described embodiment may allow for an better user experience by unlocking products that have multiple sub products in their package in a seamless manner that is similar to unlocking just one product by itself.

With continued reference to FIG. 2, in other embodiments, wireless communication device 140 may communicate with a near field communication (NFC) chip. As used in this disclosure, a "near field communication chip" is a component that enables external device to communicate with other devices such as apparatus 100 wirelessly, within a short range using near-field communication technology, wherein the near-field communication technology may enable NFC chip to execute a plurality of communication protocols that enables communication between two devices, such as, without limitation, wireless communication device 136 to external device, over a distance of 4 cm (1.5 inches) or less. NFC chip may offer a low-speed connection used to bootstrap one or more wireless connection similar to proximity card technology; for instance, and without limitation, NFC chip may function as a smart card. Additionally, or alternatively, NFC chip may further include an antenna, for example antenna 132 described herein, communicatively connected to it. As used in this disclosure, an "antenna" is a device configured to convert voltage from a transmitter into a radio signal. Antenna 132 may pick radio signals out of the air and convert them into voltage for recovery in a receiver. In an embodiment, antenna may include a transducer. In some cases, a plurality of antennas may be connected to wireless communication device 140. In a non-limiting example, wireless communication device 140 may communicate with NFC chip using a frequency of 13.56 MHZ in globally available unlicensed radio frequency ISM band using ISO/IEC 18000-3 air interface standard at data rates ranging from 106 to 424 kbit/s.

Still referring to FIG. 2, as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Further referring to FIG. 2, in some cases, processing circuit 136 may perform one or more signal processing steps on a signal. For instance, processing circuit 136 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 2, in some embodiments, identification data may include a unique identifier (ID) associated with an NFC chip and/or external device. For instance, NFC chip may include an NFC chip as described in U.S. patent application Ser. No. 18/211,706, filed on Jun. 20, 2023, and entitled "APPARATUS AND METHOD FOR AEROSOL DELIVERY," which its entirety is incorporated herein by reference. As used in this disclosure, a "unique identifier" is an element of data that uniquely identifies external device and/or NFC chip. In an embodiment, unique identifier may include a sequence of numbers. In another embodiments, unique identifier may include a combination of numbers, letters, and/or characters. In some embodiments, unique identifier may be generated, by apparatus 100, and/or any other computing device, during production of the external device. In a non-limiting example, after quality control and puff sensor machine testing during production, apparatus 100 may generate and/or assign a unique ID to external device through NFC chip that is in communication with apparatus 100. Unique ID may be encoded on the NFC chip and/or stored in apparatus 100 as described herein. In some embodiments, communication between apparatus 100 and external device may be in real-time as communicated through communication network described above. In a non-limiting example, processing circuit 136 may be configured to receive identification data, such as, without limitation, unique ID, user metadata, and the like from external device through wireless communication device 140 using NFC chip in the external device. Such communication may be triggered when NFC chip is detected within the specified range by apparatus 100 as described in further detail below. Additionally, or alternatively, transmitting unique ID associated with NFC chip may provide manufacturing businesses quality control, especially in complex electric, mechanical, and chemical systems such as vaporizers or other aerosol generating devices for quality assurance during manufacturing and/or selling products. Aerosol delivery device with NFC enabled, such as, without limitation, external devices discussed herein with unique ID may allow the manufacturer to identify and isolate any affected batches during and/or after manufacturing. This could assist in recalls or in alerts to retailers not to sell products within affected batches. Further, by transmitting unique ID associated with NFC chip for each device purchased, retailers and the brand may track inventory and rate of sales to ensure stocking issues are avoided. Additionally, or alternatively, unique identifier may include any unique identifiers as described in U.S. patent application Ser. No. 18/211,726, filed on Jun. 20, 2023, and entitled "APPARATUS AND METHOD FOR UNIQUE IDENTIFICATION OF AN OBJECT USING NEAR-FIELD COMMUNICATION (NFC)," which its entirety is incorporated herein by reference.

With continued reference to FIG. 2, in some embodiments, apparatus 100 may initiate the communication with external device; for instance, and without limitation, NFC reader may send one or more commands to NFC chip within external device within a distance via magnetic field such as, without limitation, command configuring a processing circuit to send identification data, and/or any processing steps described below in this disclosure. In some embodiments, apparatus 100 and/or processing circuit may be capable of writing data into NFC chip, such as NFC chip described herein. In a non-limiting example, apparatus 100 and/or processing circuit may be used to write a generated unique ID into NFC chip. For instance, at a factory level, NFC chips can be encoded with a unique ID and data relating to the manufactured products, and then get integrated into devices or products. Additionally, or alternatively, at this stage products can also be locked. The data encoding on the NFC chips may include any manufacturing information as disclosed in U.S. patent application Ser. No. 18/211,726, filed on Jun. 20, 2023, and entitled "APPARATUS AND METHOD FOR UNIQUE IDENTIFICATION OF AN OBJECT USING NEAR-FIELD COMMUNICATION (NFC)," which its entirety is incorporated herein by reference. Methods for encoding data at a factory level may vary from manual encoding to a preferred automated encoding. Data generated from the manufacturing lines may be captured in the electronic data capture from a manufacturer of external device and associated products, and then may be used to generate the unique IDs and relevant information for encoding on the product. Further, methods for encoding may also include a step executed by a human or machine operator during manufacturing where the human is required to place the product on the NFC reader, such as apparatus 100. Additionally, or alternatively, human or machine operator may receive an indication of successful encoding of data, the operator may be instructed to iteratively cycle to the next product from the assembly line. Embodiments of software and work steps are found in FIG. 3-6, described in more detail below.

With continued reference to FIG. 2, apparatus 100 may also perform a function for the company and manufacturer as an intermediate step. First, apparatus 100 may be used to assess the quantity and SKUs of inventory in stock in a warehouse, by communicating either directly with the end products (in the case of RFID) or read an NFC chip that encodes information on bulk quantities found in a product case or a product pallet. Furthermore, the company can set up new authorized vendors/point of sale locations with information and set restriction parameters of quantity limitations or product SKU limitations. Embodiments of these work steps and screens are found in FIGS. 7-10.

With continue reference to FIG. 2, at the point of sale, apparatus 100 may be provided to authorized retailers and may be used to unlock external devices by placing the external device near apparatus 100 if age verification was performed. As part of age verification, apparatus 100 may save the ID of the external device and any data associated with the external device and send the ID and any associated data to the internal company server. First, this allows for age verification at the point of sale to be enforced as a company policy. Secondly, this allows for traceability in the supply chain and counterfeit prevention. More importantly, it allows devices that were sold to minors to be traced back to the retail location and the time of purchase. If this is a consistent pattern of underage usage, this data can be used by the retailer, the company, or the Food and Drug Administration (FDA) to determine if a systemic underage sale problem exists and what action steps are best taken. Embodiments of these work steps and screens are found in FIGS. 11-14.

Still referring to FIG. 2, apparatus 100 may be also configured to receive usage data of external device by communicating with NFC chip of external device described herein. In an embodiment, when the apparatus 100 is brought into close proximity with external device, NFC chip may send usage data to apparatus 100 via a wireless signal. Apparatus 100 may process usage data using any computing device within, such as processing circuit 136, or communicatively connected to apparatus 100 such as, without limitation, a remote server as described below. In a non-limiting example, in the case of a reward program, the user may be incentivized to tap external device on apparatus 100 for a recycling reward, providing usage data in a seamless fashion. In another non-limiting example, processing of usage data may be used in running a clinical study measuring the actual use of external devices. In other cases, a Bluetooth Low Energy (BLE) with/without MCU may be used to transmit usage data after activation by scanning NFC chip and/or external device with apparatus 100.

Continuing to refer to FIG. 2, additionally, or alternatively, apparatus 100 may be communicatively connected to a remote server. As used in this disclosure, a "remote server" is a piece of computer hardware or software (i.e., computer program) that provides functionality for other programs or devices (known as clients). Remote server may provide various functionalities such as sharing data or resources and performing computation among multiple other programs and or devices. Remote servers may include database servers, file servers, mail servers, print servers, web servers, and/or application servers. In an embodiment, remote server may communicate with apparatus 100 and/or any computing device described in this disclosure through a communication network described above. In a non-limiting example, apparatus 100 may include a SIM card and is connected to the internet. Apparatus 100 may be configured to transmit received identification data to remote server. Apparatus 100 may send a web request to remote server, wherein the web request is a type of communication protocol for data transmission made by a client, such as, without limitation, apparatus 100. Communication protocol may include, but is not limited to, internet protocol (IP), transmission control protocol (TCP), inter-access point protocol, address resolution protocol (ARP), dynamic host configuration protocol (DHCP), file transfer protocol (FTP), internet control message protocol (ICMP), and the like thereof.

With continued reference to FIG. 2, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 2, apparatus 100 may be configured to store identification data, such as, without limitation, user metadata, unique identifier, and the like to a data store. In some cases, apparatus 100 may also be configured to store usage data of external device described herein. In an embodiment, data store may include a database. In some embodiments, a "data store" may be referred to as a "database." Data store may be implemented, without limitation, as a relational database, a key-value retrieval database such as a NOSQL database, or any other format or structure for use as a database that a person skilled in the art would recognize as suitable upon review of the entirety of this disclosure. Data store may alternatively or additionally be implemented using a distributed data storage protocol and/or data structure, such as a distributed hash table or the like. Data store may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure. In a non-limiting example, apparatus 100 may transfer received identification data along with a data received timestamp (i.e., timestamp of when the user purchases an external device) to remote server. Remote server may then store identification data and the data received timestamp to data store.

With continued reference to FIG. 2, apparatus 100 may be further configured to post identification data, such as, without limitation, user metadata, unique identifier, and the like to an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In a non-limiting example, remote server may generate a data entry on a decentralized platform, wherein the block may be configured to store unique ID associated with an NFC chip and/or an external device. A "decentralized platform," as described herein, is a platform or server that enables secure data exchange between anonymous parties. Decentralized platform may be supported by any blockchain technologies. For example, and without limitation, blockchain-supported technologies can potentially facilitate decentralized coordination and alignment of human incentives on a scale that only top-down, command-and-control structures previously could. Decentralized platform may serve as an ecosystem for decentralized architectures such as immutable sequential listing and/or blockchain. In a non-limiting example, remote server may generate a block configured to store unique ID associated with NFC chip and/or external device and post the block to immutable sequential listing. Unique ID associated with NFC chip and/or external device stored in the block may be retrieved, by remote server and/or any other computing device, from immutable sequential listing; however, remote server and/or any other computing device may not change, modify, or otherwise update unique ID associated with NFC chip and/or external device in any way.

With continued reference to FIG. 2, in some embodiments, communication between apparatus 100 and external device may be configured to provide real-time end-to-end tracking of products from manufacturing to point of sale of apparatus 100, thereby providing an authentication and tracing mechanism. Additionally, or alternatively, automated supply chain tracking through point-of-sale identification data transmission may be provided to manufacturers of external devices in order for them to track sales, predict restocking needs of retailers, and anticipate manufacturing volume of such external devices. Implementation of NFC technology described in this disclosure may have an advantage in that it provides a low-cost solution to boost sales and increase profitability. In a non-limiting example, for both consumer and medical applications, aerosol delivery device with NFC-enabled technology, such as, without limitation, external devices described herein, may be configured to trace products in the supply chain, allowing an integrated method of complying with strict medical device supply chain guidelines or regulatory requirements for tracing age-restricted products, verify authenticity of product vis-a-vis counterfeits, monitor sales locations and sales behaviors, assist in re-stocking of product at retail, and/or provide data for consumer/patient behavior. In some embodiments, identification data stored and tracked by remote server may be used for identification of the source and the likelihood of a batch containing faulty devices. In this case, identification data may help link batch, processing, and manufacturing data for future optimization.

With continued reference to FIG. 2, processing circuit 136 is configured to generate an external response from the apparatus to external device. As used in this disclosure, an "external response" is a signal received from remote server and/or any computing device in wireless communication with external device as a response to receiving identification data. External response is generated, by processing circuit 136, as a function of identification data. In some embodiments, external response may be generated as a function of a request from external device, such as, without limitation, request for identification data verification. External response may be generated by one or more web APIs. For instance, and without limitation, remote server may include one or more APIs configured to process, analyze, and/or verify identification data. In an embodiment, generating external response may include comparing, by remote server, identification data with a historical identification data, wherein historical identification data is pre-saved identification data associated with external devices at the point of manufacture. Both historical identification data and identification data may reference the same device. Historical identification data may be stored and/or retrieved from data store. For example, and without limitation, unique ID associated with NFC chip and/or external device may be stored in data store when NFC chip is positioned within external device during manufacturing. Remote server may generate external response as a function of the comparison; for instance, and without limitation, if there is historical identification data that matches with identification data, remote server may generate an external response containing instructions to unlock external device, otherwise, remote server may generate an external response containing instructions to lock external device. In some embodiments, external devices may be enabled to perform age restriction on the use of the external device based on the external response. Aerosol Delivery Devices, including but not limited to vaporizers, heat not burn, nebulizers, metered-dose inhalers, along with other aerosol generating products may require a robust method for age-verification of age restricted products at the point of sale, including enforcement of age verification in many retail locations without reliance on store clerks to enforce checking of IDs. Additionally, the disclosed embodiments provide manufacturers the ability to regulate the sale of nicotine to minors in retail locations such as convenience stores. Additionally, or alternatively, in the scenario where the external device delivers prescribed medications such as controlled substances, disclosed embodiments may also serves as an enforcement method to perform "identity verification" of the patient at a pharmacy or anywhere else. In another embodiment, the disclosed embodiments may be configured to track the origin of the aerosol generating device to the point of sale or otherwise investigate how a device was obtained, for regulatory, legal reasons, or otherwise.

With continued reference to FIG. 2, as used in this disclosure, "verification" is a process of ensuring that which is being "verified" complies with certain constraints, for example without limitation system requirements, regulations, and the like. In some cases, verification may include comparing a product, such as without limitation identification data, against one or more acceptance criteria. For example, in some cases, identification data may be required to contain user metadata specifying user's age is over 21. Ensuring that identification data is in compliance with acceptance criteria may, in some cases, constitute verification. In some cases, verification may include ensuring that data is complete, for example that all required data types, are present, readable, uncorrupted, and/or otherwise useful for processing circuit 136. In some cases, some or all verification processes may be performed by a remote server. Additionally, or alternatively, as used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation identification data against a specification. In some cases, remote server may be additionally configured to validate a product by validating constituent sub-products. In some embodiments, remote server may be configured to validate any product or data, for example without limitation identification data. In a non-limiting example, validating identification data such as, without limitation, unique ID associated with NFC chip and/or external device, may include iterating, by remote server, immutable sequence listing containing a plurality of unique IDs as described above. Unique ID may be valid if remote server successfully locates and/or retrieves a same unique ID on immutable sequential listing. On the other hand, unique ID may be invalid if remote server fails to locate and/or retrieve same unique ID on immutable sequential listing.

In a non-limiting example, and further referring to FIG. 2, external response may include an HTTP transaction message, wherein the HTTP transaction message may include, without limitation, transaction status (e.g., 200, 400, 404, 500, and the like), response headers, response body, and the like thereof. Apparatus 100 may include an ID reader configured to capture user identification data from a form of identification associated with a user; for instance, and without limitation, apparatus 100 and/or processing circuit 136 may be configured to verify user identification data (i.e., name, date of birth, ID number, and the like) read from the ID reader. Additionally, or alternatively, ID reader may include an optical sensor for verification of user identification data. For example, optical sensor may be configured to determine if user identification data, such as a government issued identification, driver's license, passport and the like, received by apparatus 100 includes various pieces of data such as a birthday data associated with an individual. In one example, birthday data may include a birthday format, such as DD/MM/YYYY format, and optical sensor may be configured to determine if such a format is recognized, processing circuit 136 may be configured to store the birthday data locally and compare to the birthday data to a cutoff date of legal purchasing requirements (e.g., a date 18 years or any number of years before a transaction date to ensure user meets an age requirement for external device). Additionally, or alternatively, apparatus 100 may be configured to activate and unlock an external device, as described herein, when a comparison between the birthday data and the cutoff date indicates the birthday data is earlier than the cutoff date (e.g., the user meets the age requirements for the external device). Further, additionally, or alternatively, apparatus 100 may be configured to remain inactive and/or lock external device, as described herein, when a comparison between the birthday data and the cutoff data indicates the birthday data is after the cutoff date (e.g., the user does not meet the age requirements for external device). Optical sensor may be used to determine the age of a user through a variety of ID formats, without having to read the ID itself or deal with personally identifiable information or government on government issued documents. Additionally, or alternatively, optical sensors may be configured to capture a photo of a user and processing circuit 136 may be configured compare the photo of the person on the ID with the captured photo of the user, which may be used to ensure no fake IDs or IDs of other individuals are used to purchase the external device. In another embodiment, apparatus 100 may include an API configured to perform user identification data verification, wherein the API may be configured to take user identification data such as, without limitation, user metadata, unique ID, and the like as input. Apparatus 100 and/or remote server may be configured to generate external response containing a verification datum as a function of input user identification data. As used in this disclosure, a "verification datum" is an element of data related to a result of data verification. Additionally, or alternatively, apparatus 100 and/or processing circuit 136 may be configured to generate external response as a function of the comparison between the birthday data and the cutoff date and/or the comparison the photo of the person on the ID with the captured photo of the user. In some cases, verification datum may include a data structure containing values representing yes-or-no answers; for instance, and without limitation, verification datum may include value in Boolean data type such as "TRUE" or "FALSE." Apparatus 100 and/or remote server may calculate a current age of the users based on received user identification data, and compare the current age with an age threshold such as, without limitation, value of 21. Apparatus 100 may generate a verification datum of "TRUE" if current age exceeds age threshold. On the other hand, apparatus 100 may generate a verification datum of "FALSE" if current age below age threshold. Such verification datum may be embedded into external response; for instance, and without limitation, apparatus and/or remote server 152 may write verification datum into the response body of external response 160. Apparatus 100 may be further configured to output and/or transmit external response containing verification datum to external device. User may be valid (>21) if and only if external response containing a transaction status of 200 and "TRUE" as verification datum, while external response containing a transaction status of 400 and a verification datum with "FALSE" value may indicate an invalid user (<21).

With continued reference to FIG. 2, processing circuit 136 may be configured to generate a user interface data structure based on the identification data, usage data, external response, and any data described herein. Additionally, or alternatively, processing circuit 136 may be configured to generate the user interface data structure 160 to include any combination of identification data, usage data, verification data, and any data described herein. The user interface data structure 160 may allow any of identification data, usage data, and any data described herein to be displayed on display, graphical user interface, and the like. Each of the identification data, usage data, and any data described herein may be reviewed by a sales associate at a point of sale and/or any other associated users to review and manage any aspect of the data displayed.

Continuing to refer to FIG. 2, processing circuit 136 is connected to display 108. Display may include a graphical user interface (GUI) configured to display any information from apparatus 100 and/or any computing device. As used in the current disclosure, a "graphical user interface" may include a plurality of lines, images, symbols. GUI may be displayed on a display device 108. Display device may include, but is not limited to, a smartphone, tablet, laptop, monitor, tablet, and the like. Display device may include a separate device that includes a transparent screen configured to display computer generated images and/or information.

The user may view the information displayed on the display device in real time. GUI may be configured to receive user input. A "user input" as used in this disclosure is information received from an individual. User input may include, for instance and without limitation, information entered via text fields, information entered via clicking on icons of a graphical user interface (GUI), information entered via touch input received through one or more touch screens, and the like.

With further reference to FIG. 2, the GUI 164 may be configured to receive the user interface data structure for any combination of identification data, usage data, and any data described herein. Additionally, or alternatively, the GUI 164 may be configured to display identification data, usage data, and any data described herein as a function of the user interface data structure for review by a user, sales associated, and any other associated users described herein.

Continuing to refer to FIG. 2, apparatus 100 may be communicatively connected to a digital identity verification platform. In an embodiment, digital identity verification platform may be configured to receive user metadata from a user device associated with a user, a datastore, apparatus 100, and the like. Digital identify verification platform may be communicatively connected to a plurality of data sources, for example credit bureaus, department of motor vehicle databases, and the like. Digital identity verification platform may be configured to verify a user identity at a point-of-sale. In an embodiment, digital identity verification platform may be configured to receive user metadata associated with a user, aggregate additional user data from a plurality of connected data sources, and verify an identity of the user as a function of a comparison of the user metadata and the aggregated additional user data. Additionally, or alternatively, digital identity verification platform may be configured transmit a verification datum to apparatus as a function of the verified user data. As used in this disclosure, "verification datum" is piece of information used to confirm the authenticity, identity, or validity of an individual, or user for usage of an external device described herein. Further, additionally or alternatively, digital verification platform may be configured to generate a machine readable optical image, such as a bar code, QR code, and the like, as a function of the verification of the identity of the user. Additionally, or alternatively, apparatus 100 may include an optical scanner. Optical scanner may be configured to receive verified user data from the machine readable optical image and transmit a verification datum to apparatus as a function of the received verified user data. Additionally, or alternatively, apparatus for near field communication (NFC) may be configured to unlock and/or lock an external device, described in more detail below, based on the received verification datum.

Still referring to FIG. 2, apparatus 100 may include a biometric reader. Biometric reader may be configured to receive biometric data from a user, such as a fingerprint, palm print, and the like. Additionally, or alternatively, apparatus for near field communication (NFC) may be configured to unlock and/or lock a product based on the received biometric data from the biometric reader. As described above, digital identify verification platform may be communicatively connected to a plurality of data sources, for example credit bureaus, department of motor vehicle databases, and the like. Digital identity verification platform may be configured to verify a user identity at a point-of-sale based on biometric data from the user. In an embodiment, digital identity verification platform may be configured to receive biometric associated with a user, aggregate additional user biometric data from a plurality of connected data sources, and verify an identity of the user as a function of a comparison of the user biometric data and the aggregated additional user biometric data. Further, additionally or alternatively, digital verification platform may be configured to generate a machine readable optical image, such as a bar code, QR code, and the like, as a function of the verification of the identity of the user.

Continuing to refer to FIG. 2, apparatus 100 may be configured to use electromagnetic fields to unlock a product. For example, a product may include an RFID that is integrated into the product to be unlocked. Additionally, or alternatively, the RFID may include a unique ID. In an embodiment, integration with a point of sale system may require a receipt of user metadata, such as the scanning of an ID and other metadata described herein, and the scanning of an external device bar code or another unique code of the product to receive product information using methods described herein. Additionally, or alternatively, after the transaction is complete, apparatus 100 may be configured to send a signal to the RFID in the external device, and external device may be configured to modify a usage state for the external device as a function of the signal. Once the product is unlocked, external device may also be configured to power secondary verification as a function of the unlocking. For example, a biometric scanner on external device may become active after the unlocking is complete, described in additional detail below, and the biometric scanner may be configured to receive biometric data from a first user to place their finger on the biometric scanner and external device is configured to identify the first user associated with the biometric data as the authorized user based on the biometric data. For example, external device and biometric scanner may include any apparatus for preventing youth access and counterfeit aerosol delivery cartridges and biometric sensor as described in U.S. patent application Ser. No. 18/410,193, filed on Jan. 11, 2024, and entitled "APPARATUS AND METHOD FOR PREVENTING YOUTH ACCESS AND COUNTERFEIT AEROSOL DELIVERY," which its entirety is incorporated herein by reference.

Still referring to FIG. 2, in some cases, instead of configuring external response 160 to just lock and unlock external device as described above, external device may be programed to activate technology such as a biometric sensor in external device. As used in this disclosure, a "biometric sensor" is a device that captures and measures specific physiological or behavioral characteristics of the user for biometric identification or authentication. In an embodiment, biometrics may include unique and measurable traits of the user which may be used to verify user's identity and grant access to external device. In a non-limiting example, biometric sensor may include any device that integrates fingerprint scanner, facial recognition solution, voice recognition, iris scans, palm prints, hand geometry, and/or the like to limit only authorized users from using external device for the delivery for certain active ingredients. External device may be activated at the point of sale (using NFC reader 148), after verifying user ID (i.e., sending identification data), a limited time window to fingerprint user on external device is given to the authorized purchaser (in some cases, authorized purchaser may be the user); external device may need to be reactivated at a point of sale (using apparatus 100) to limit aftermarket sale; However, user within a specific amount of time uses a finger, for example, and without limitation, a thumb on their hand of use, biometric sensor such as a finger printer scanner may be allowed to take shots from a few angles. Such fingerprint scan may then be used to reactive external device (either per inhalation, or for a specific amount of time) for the authorized user at a later time.

Still referring to FIG. 2, apparatuses and methods as described herein may be used for track and trace of products. In an embodiment, each object may have an NFC tag, which may include an NFC Chip and an NFC Antenna. Data can be stored on this NFC tag, specifically data may include any data relating to Object Manufacturing Data. Data may include information on the object's components, the object's manufacturing process, the machinery used to manufacture the object, shipping routes, currency of purchase, purchaser identities, and the like. The system and methods as described herein may be in compliance with EU traceability regulation for Tobacco Products, 2018/574. As such, apparatuses and methods may be used to track the data points described below, in the form of a unique product code inscribed on the NFC chip, as detailed in 2018/574. In an exemplary embodiment, tracked data points may include a place of manufacturing, a numeric sequence of eight characters, in the format YYMMDDhh, indicating the date and time of manufacture, a manufacturing facility, a machine used to manufacture an external device, a product description, an intended market of retail sale, an intended shipment route an importer, and the like. Apparatus 100 may be used to perform two functions. First, apparatuses and methods may be used to encode the NFC chip at the point of manufacturing with the required data. Data gathering is done through the company's ERP systems, and an automated software program that may be used to create the unique code and then writes the individual data elements onto the chip. As the chip is encoded, data is saved on the cloud server for later retrieval on every chip. By encoding each chip with a unique ID generated from attributes of the product, each NFC-enabled product is unique with its digital ID and traceable from the point of manufacture throughout its lifecycle. At the point of sale, a second NFC reader, such as any apparatus described herein, may be configured to read the unique ID off the NFC chip. Second NFC reader may be designed as a point-of-sale terminal with a screen and internet connectivity. Second NFC reader may be configured to retrieve information off the chip, once the chip is placed within a distance of about 4-about 10 centimeters, and send the information to a cloud server. Further, second NFC reader may be configured to collect data on the sale itself, such as the time of the sale and the location of the sale. Additionally, second NFC reader may allow for other data gathering and integrations with other systems are possible. Once the data is transferred to a cloud server, data used to encode the NFC chip at the point of manufacturing and data from the sale process can be combined to allow a complete data set on a per-product basis from manufacturing to sale. For electronic products, the coupling of the NFC chip with the operating state of the devices allows for the locking and unlocking of the product using apparatuses and methods described herein. The product locking can be achieved by coupling the NFC chip with the electrical control system of devices and disabling the electrical flow to the devices. As such, locked devices are not workable or usable by consumers. Unlocking the product's electrical system requires a point-of-sale NFC terminal, such as apparatuses described herein, whereby the reader communicates instructions to the NFC-enabled product. In an embodiment, a product, such as external device, may be unlocked upon a successful communication. In an embodiment, a successful communication may be contingent on the following: 1) the product is in close proximity to the NFC reader and 2) the ID encoded on the product is unique and authentic when compared to the database of products. If the product ID is not genuine (i.e., counterfeit) or has already been scanned (is duplicated), the NFC reader may be configured to not unlock the device. Further, additionally, or alternatively, IDs flagged in the system as a recall or non-compliance would further not be unlocked. For non-electronic products, the NFC chip may be used to perform a track and trace function. The NFC chip can similarly be scanned on the NFC reader at the point of manufacturing to encode data, and the NFC terminal at the point of sale gathers that data when in close proximity to the reader. Thus, traceability is achieved from manufacturing throughout the checkout process. For carton and case tracking, a simple NFC sticker on the outside of the box, outside of the case, and outside of the pallet may be used for tracking. The unique code encoded on the NFC sticker can provide information on the unit contents and be accessed through a scan by any computing device, such a smart phone, personal computer, and the like.

Still referring to FIG. 2, additionally, apparatuses and methods described herein may be used for digital tax stamping. Apparatuses and methods may also provide a process for verifying the correct payment by manufacturers of excise and other taxes on products they produce, which may assist in addressing the issue of local tax evasion. NFC-encoded product IDs can serve as a digital tax stamp or a fiscal marker. As each ID is unique, taxation can be implemented at a product level. For taxation purposes, each product NFC ID can correspond to a taxation scheme on the product level. For instance, one class of NFC IDs corresponds to taxation scheme 1, and a second class of NFC IDs corresponds to taxation scheme 2. Different taxation schemes can correspond to different rates of duty, e.g. a 10% tax rate on taxation scheme 1, and a 20% tax rate on taxation scheme 2. Operationally, manufacturers could either buy an allotment of NFC IDs before manufacturing or the unlocking of product through the retail NFC scanner could trigger a tax payment/duty by the manufacturer assigned to the specific NFC ID. Since the system is traceable end-to-end and the IDs are unique, no duplication or counterfeiting of IDs would be possible. Overt authentication has been criticized as being easy to copy for counterfeiters. While the NFC ID is not human readable, each modern cell phone is outfitted with NFC readers and inspectors could tap the product to verify it's authenticity and retrieve its unique ID. This would allow product authentication by authorities, trade, consumers by the use of user device, such as a smart phone. Further, apparatuses and methods described herein may be used for volume verification. As each ID is unique, a sum of all IDs issued for a product will provide the total volume manufactured, and also the total volume sold. A secure real-time connection between the manufacturing process of products and a government interface can provide the real-time overview on products manufactured for each market, by type and by manufacturer. Even if a chip were counterfeited, the nature of unique IDs would prevent a correct ID to be guessed. In the case whereby a counterfeit chip is encoded with a duplicated ID, the NFC reader at the point of sale can cross reference the data base to discover the ID is not genuine, and not unlock the product. Instead of tax stamps or codes, apparatuses and methods of using NFC chips can improve security of tax verification processes. The digital NFC tax stamp may provide the ability to government authorities that all taxes and duties are paid, and produce a record of tax paid. Lastly, component or manufacturing information stored on the NFC chip can be encrypted through the software encoding algorithms, making the retrieval of this information impossible for counterfeiters without access to a data mapping. However, apparatuses and methods described herein can make this information available to governments.

Referring now to FIGS. 3-6, a screenshot of a first exemplary embodiment 300, a second exemplary embodiment 400, a third exemplary embodiment 500, and a fourth exemplary embodiment 600 of a graphical user interface (GUI) for writing data onto NFC chip, such as NFC chip described herein, are shown. As described above, apparatus 100 and/or processing circuit 136 may be configured to write data onto NFC chip, as described herein.

Referring now to FIGS. 7-10, a first exemplary embodiment 700, a second exemplary embodiment 800, a third exemplary embodiment 900, and a fourth exemplary embodiment 1000 of a graphical user interface (GUI) for creation of new authorized vendors/point of sale locations, as described herein, are shown. As described above, apparatus 100 and/or processing circuit 136 may be configured to create new authorized vendors/point of sale locations, as described herein.

Referring now to FIGS. 11-14, a screenshot of a first exemplary embodiment 1100, a second exemplary embodiment 1200, a third exemplary embodiment 1300, and a fourth exemplary embodiment 1400 of a graphical user interface (GUI) during use of apparatus 100 by authorized vendors/point of sale locations, as described herein, are shown.

Figure 15:
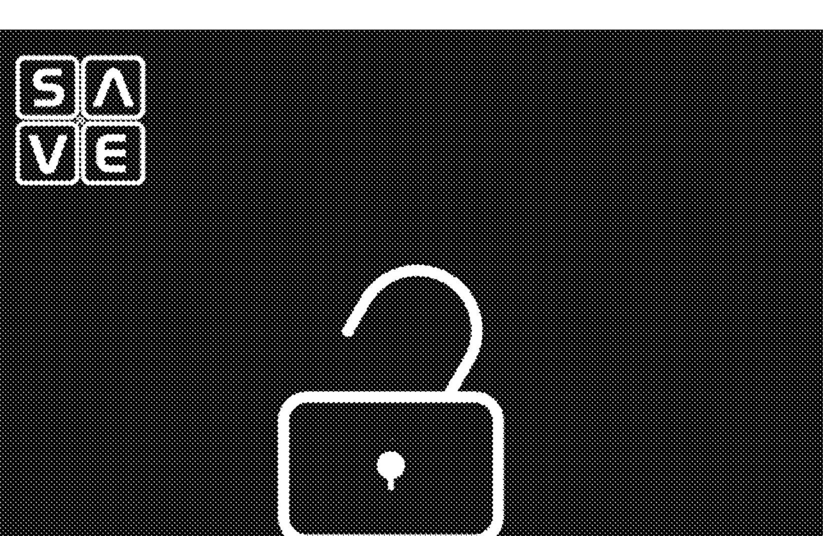
FIG. 15 is a screenshot of a first exemplary embodiment a graphical user interface (GUI) including an activation status of an external device.
Figure 16:
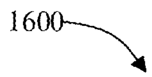
FIG. 16 is a screenshot of a second exemplary embodiment of a graphical user interface (GUI) including an activation status of an external device.
Figure 16:

Referring now to FIGS. 15 and 16, a screenshot of a first exemplary embodiment 1500 and a second exemplary embodiment 1600 of graphical user interface (GUI) including an activation status of an external device is shown. As described above, processing circuit 136 may be configured to generate a user interface data structure based on communication of data and activation status of external device received and/or sent by apparatus 100.

Figure 17:
FIG. 17 is a screenshot of an exemplary embodiment of a graphical user interface (GUI) including a recycling reward for a reward program based on a tap of an external device on apparatus 100.

Referring now to FIG. 17, a screenshot of an exemplary embodiment 1700 of a graphical user interface (GUI) including a recycling reward for a reward program based on a tap of an external device on apparatus 100 is shown. For instance, reward program may include any reward program as described in U.S. patent application Ser. No. 18/370,380, filed on Sep. 19, 2023, and entitled "METHODS FOR RECYCLING AND UPCYCLING CONSUMER ELECTRONICS WITH PLASTICS AND INTEGRATED BATTERIES," which its entirety is incorporated herein by reference. As described above, processing circuit 136 may be configured to generate a user interface data structure based on communication of data between apparatus and external device and determination of a recycling reward of external device by apparatus 100.

Figure 18:
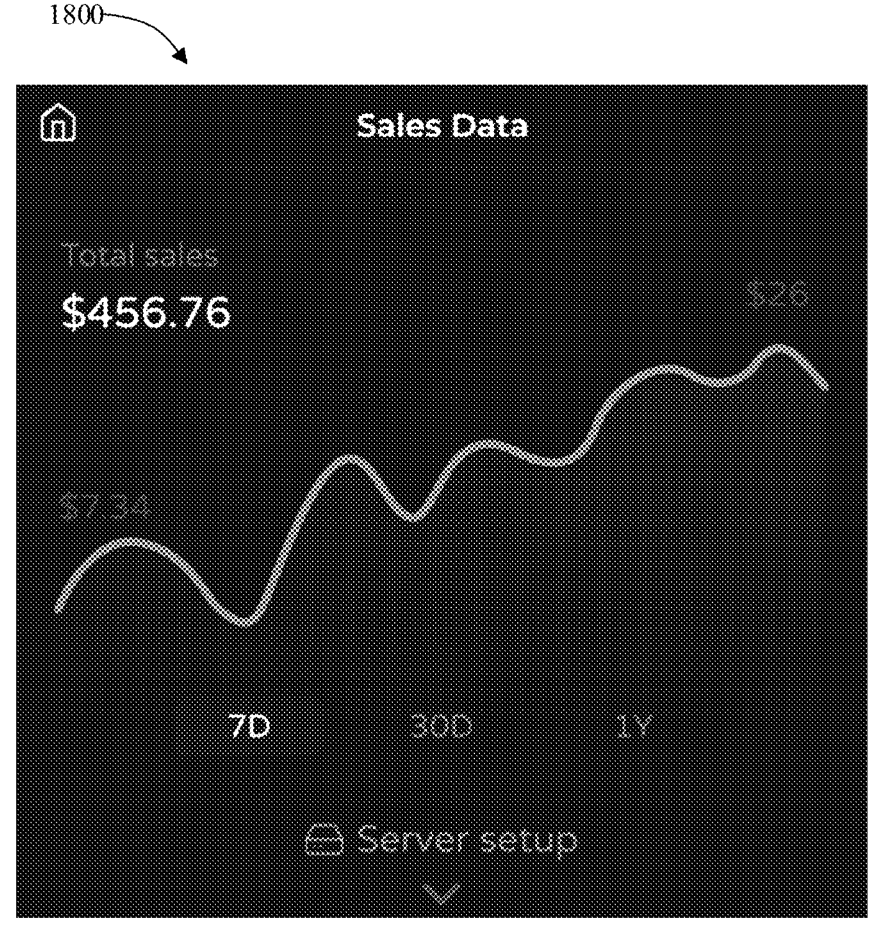
FIG. 18 is a screenshot of an exemplary embodiment of a graphical user interface (GUI) including external device transaction analysis.

Referring now to FIG. 18, a screenshot of an exemplary embodiment 1800 of a graphical user interface (GUI) including external device transaction analysis may include any sales activity data at a sales location described herein. In some embodiments, external device transaction analysis may include statistical information related to sale of a selected object such as, without limitation, revenue, units sold, unique purchases, and the like. External device transaction analysis may include one or more visualization of data listed above such as, without limitation, a line graph depicting total revenue of the selected object of previous week, previous month, previous year, and the like. In some embodiments, object transaction analysis may include statistical information related to sale of each object of a plurality of objects such as, without limitation, unit sales (YTD), total sales (YTD), week sales, transaction amount, and the like.

Figure 19:
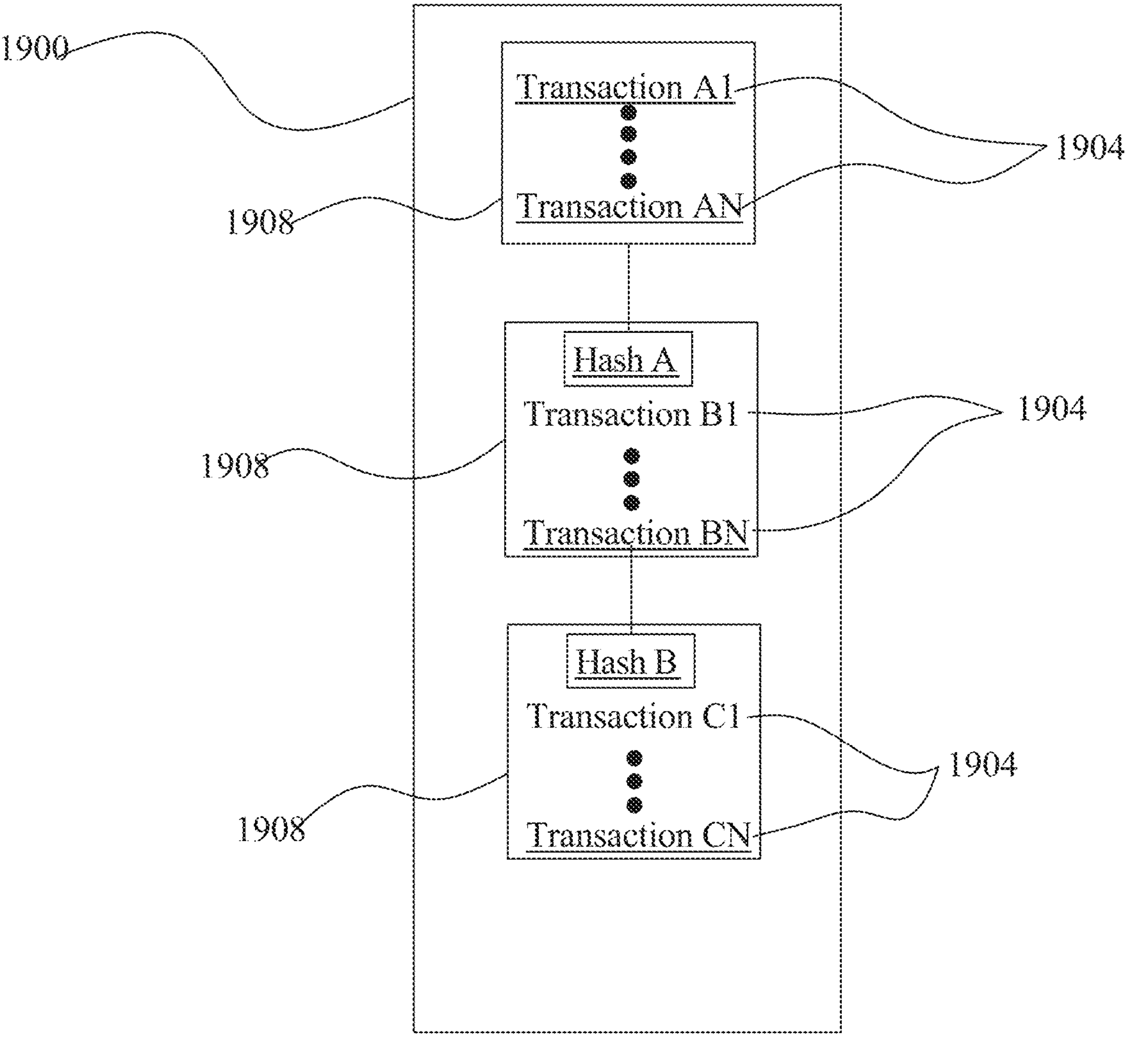
FIG. 19 is an exemplary embodiment of an immutable sequential listing.

Referring now to FIG. 19, an exemplary embodiment of an immutable sequential listing is illustrated. Data elements listed in immutable sequential listing may include any form of data, including textual data, image data, encrypted data, cryptographically hashed data, and the like. Data elements may include, without limitation, one or more at least a digitally signed assertion. In one embodiment, a digitally signed assertion 1904 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 1904 register is transferring that item to the owner of an address. A digitally signed assertion 1904 may be signed by a digital signature created using the private key associated with the owner's public key, as described above.

With continued reference to FIG. 19, a digitally signed assertion 1904 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 1904 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 19, in one embodiment, an address is a textual datum identifying the recipient of virtual currency or another item of value in a digitally signed assertion

1904. In some embodiments, address is linked to a public key, the corresponding private key of which is owned by the recipient of a digitally signed assertion 1904. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 1904 may record a subsequent a digitally signed assertion 1904 transferring some or all of the value transferred in the first a digitally signed assertion 704 to a new address in the same manner. A digitally signed assertion 1904 may contain textual information that is not a transfer of some item of value in addition to, or as an alternative to, such a transfer. For instance, as described in further detail below, a digitally signed assertion 1904 may indicate a confidence level associated with a distributed storage node as described in further detail below.

With continued reference to FIG. 19, in an embodiment, immutable sequential listing records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

With continued reference to FIG. 19, immutable sequential listing may preserve the order in which the at least a posted content took place by listing them in chronological order; alternatively or additionally, immutable sequential listing may organize digitally signed assertions 1904 into sub-listings 1908 such as "blocks" in a blockchain, which may be themselves collected in a temporally sequential order; digitally signed assertions 1904 within a sub-listing 1908 may or may not be temporally sequential. The ledger may preserve the order in which at least a posted content took place by listing them in sub-listings 1908 and placing the sub-listings 1908 in chronological order. The immutable sequential listing may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 6161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 19, immutable sequential listing, once formed, may be inalterable by any party, no matter what access rights that party possesses. For instance, immutable sequential listing may include a hash chain, in which data is added during a successive hashing process to ensure non-repudiation. Immutable sequential listing may include a block chain. In one embodiment, a block chain is immutable sequential listing that records one or more new at least a posted content in a data item known as a sub-listing 1908 or "block." An example of a block chain is the BITCOIN block chain used to record BITCOIN transactions and values. Sub-listings 1908 may be created in a way that places the sub-listings 708 in chronological order and link each sub-listing 1908 to a previous sub-listing 1908 in the chronological order so that any computing device may traverse the sub-listings 1908 in reverse chronological order to verify any at least a posted content listed in the block chain. Each new sub-listing 1908 may be required to contain a cryptographic hash describing the previous sub-listing 708. In some embodiments, the block chain contains a single first sub-listing 1908 sometimes known as a "genesis block."

Figure 7:
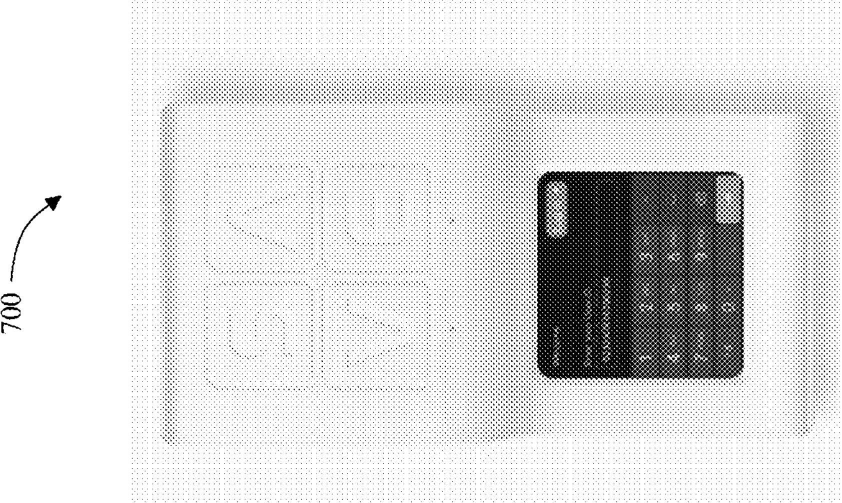
FIG. 7 is an exemplary embodiment of a first display of a GUI during creation of new authorized vendors/point of sale locations.
Figure 10:
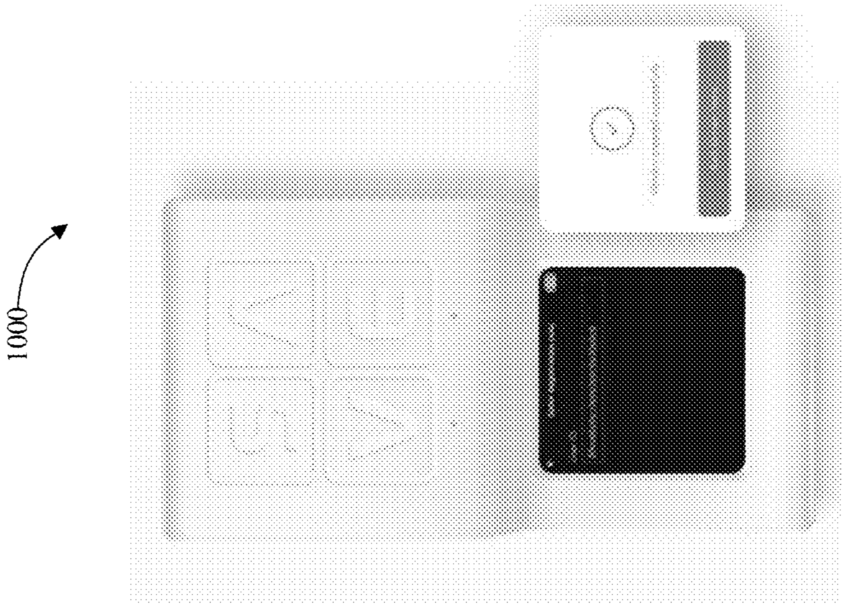
FIG. 10 is an exemplary embodiment of a fourth display of a GUI during creation of new authorized vendors/point of sale locations.
Figure 9:
FIG. 9 is an exemplary embodiment of a third display of a GUI during creation of new authorized vendors/point of sale locations.
Figure 9:
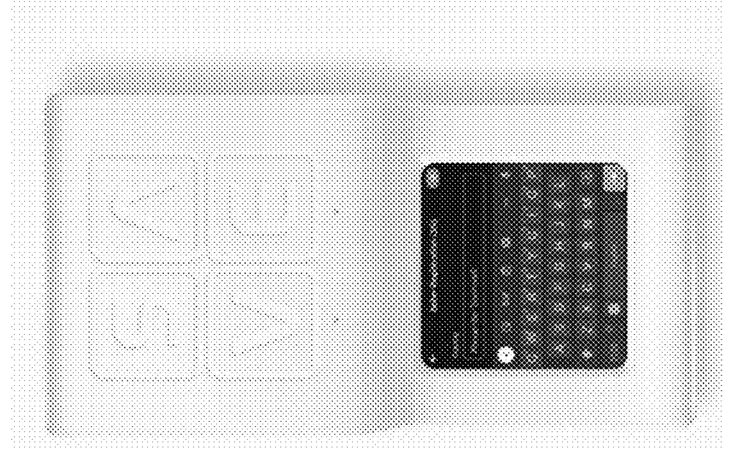
Figure 12:
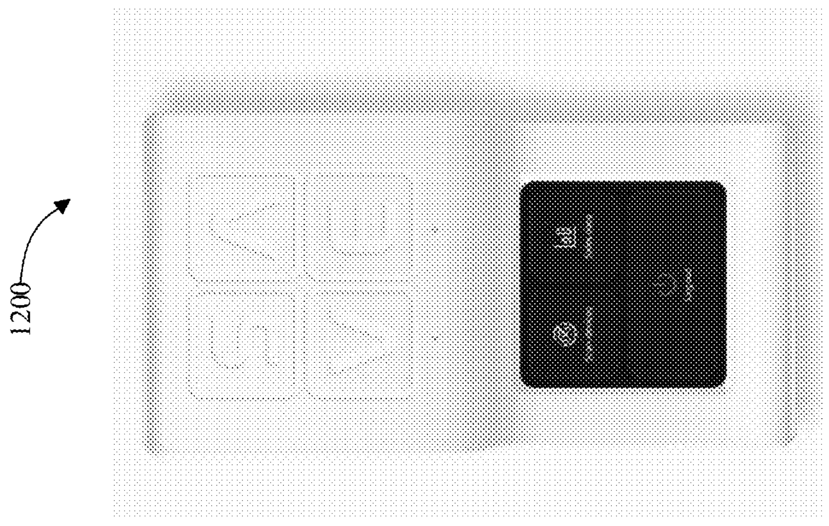
FIG. 12 is an exemplary embodiment of a second display of a GUI during use of apparatus by authorized vendors/point of sale locations.
Figure 11:
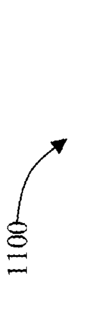
FIG. 11 is an exemplary embodiment of a first display of a GUI during use of apparatus by authorized vendors/point of sale locations.
Figure 11:
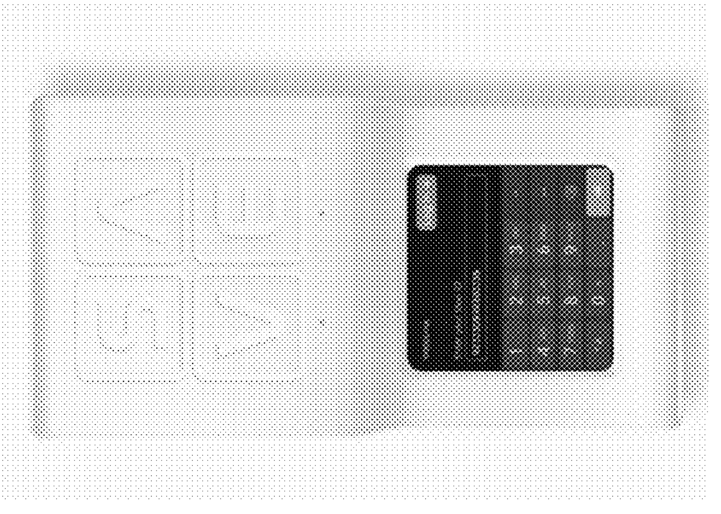
Figure 14:
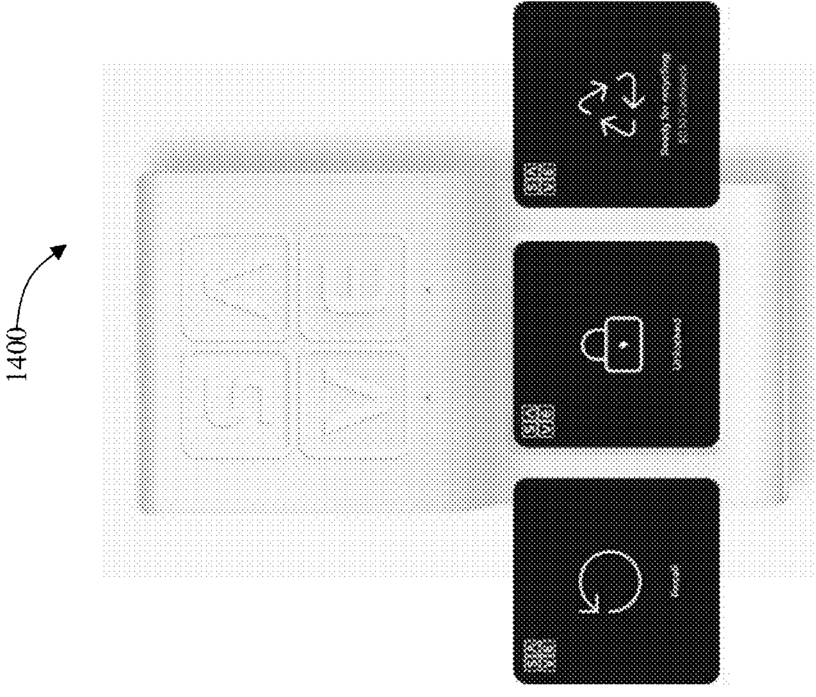
FIG. 14 is an exemplary embodiment of a fourth display of a GUI during use of apparatus by authorized vendors/point of sale locations.
Figure 13:
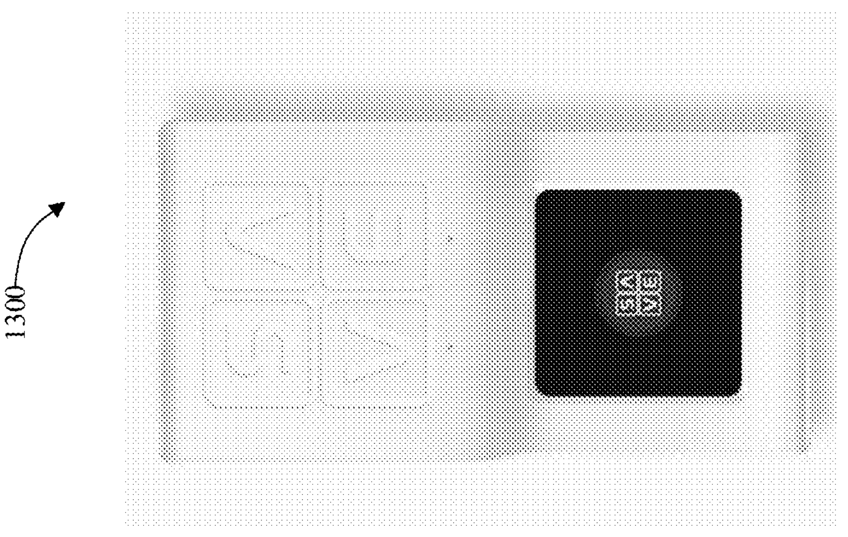
FIG. 13 is an exemplary embodiment of a third display of a GUI during use of apparatus by authorized vendors/point of sale locations.

Still referring to FIG. 7, the creation of a new sub-listing 1908 may be computationally expensive; for instance, the creation of a new sub-listing 1908 may be designed by a "proof of work" protocol accepted by all participants in forming the immutable sequential listing to take a powerful set of computing devices a certain period of time to produce. Where one sub-listing 1908 takes less time for a given set of computing devices to produce the sub-listing 1908 protocol may adjust the algorithm to produce the next sub-listing 1908 so that it will require more steps; where one sub-listing 1908 takes more time for a given set of computing devices to produce the sub-listing 1908 protocol may adjust the algorithm to produce the next sub-listing 1908 so that it will require fewer steps. As an example, protocol may require a new sub-listing 1908 to contain a cryptographic hash describing its contents; the cryptographic hash may be required to satisfy a mathematical condition, achieved by having the sub-listing 1908 contain a number, called a nonce, whose value is determined after the fact by the discovery of the hash that satisfies the mathematical condition. Continuing the example, the protocol may be able to adjust the mathematical condition so that the discovery of the hash describing a sub-listing 1908 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 1908 according to the protocol is known as "mining." The creation of a new sub-listing 1908 may be designed by a "proof of stake" protocol as will be apparent to those skilled in the art upon reviewing the entirety of this disclosure.

Continuing to refer to FIG. 19, in some embodiments, protocol also creates an incentive to mine new sub-listings 1908. The incentive may be financial; for instance, successfully mining a new sub-listing 1908 may result in the person or entity that mines the sub-listing 1908 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 1908 Each sub-listing 1908 created in immutable sequential listing may contain a record or at least a posted content describing one or more addresses that receive an incentive, such as virtual currency, as the result of successfully mining the sub-listing 1908.

With continued reference to FIG. 19, where two entities simultaneously create new sub-listings 708, immutable sequential listing may develop a fork; protocol may determine which of the two alternate branches in the fork is the valid new portion of the immutable sequential listing by evaluating, after a certain amount of time has passed, which branch is longer. "Length" may be measured according to the number of sub-listings 1908 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 1908 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Still referring to FIG. 19, additional data linked to at least a posted content may be incorporated in sub-listings 1908 in the immutable sequential listing; for instance, data may be incorporated in one or more fields recognized by block chain protocols that permit a person or computer forming a at least a posted content to insert additional data in the immutable sequential listing. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 19, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 1908 in a block chain computationally challenging; the incentive for producing sub-listings 1908 may include the grant of new crypto-currency to the miners. Quantities of crypto-currency may be exchanged using at least a posted content as described above.

Figure 20:
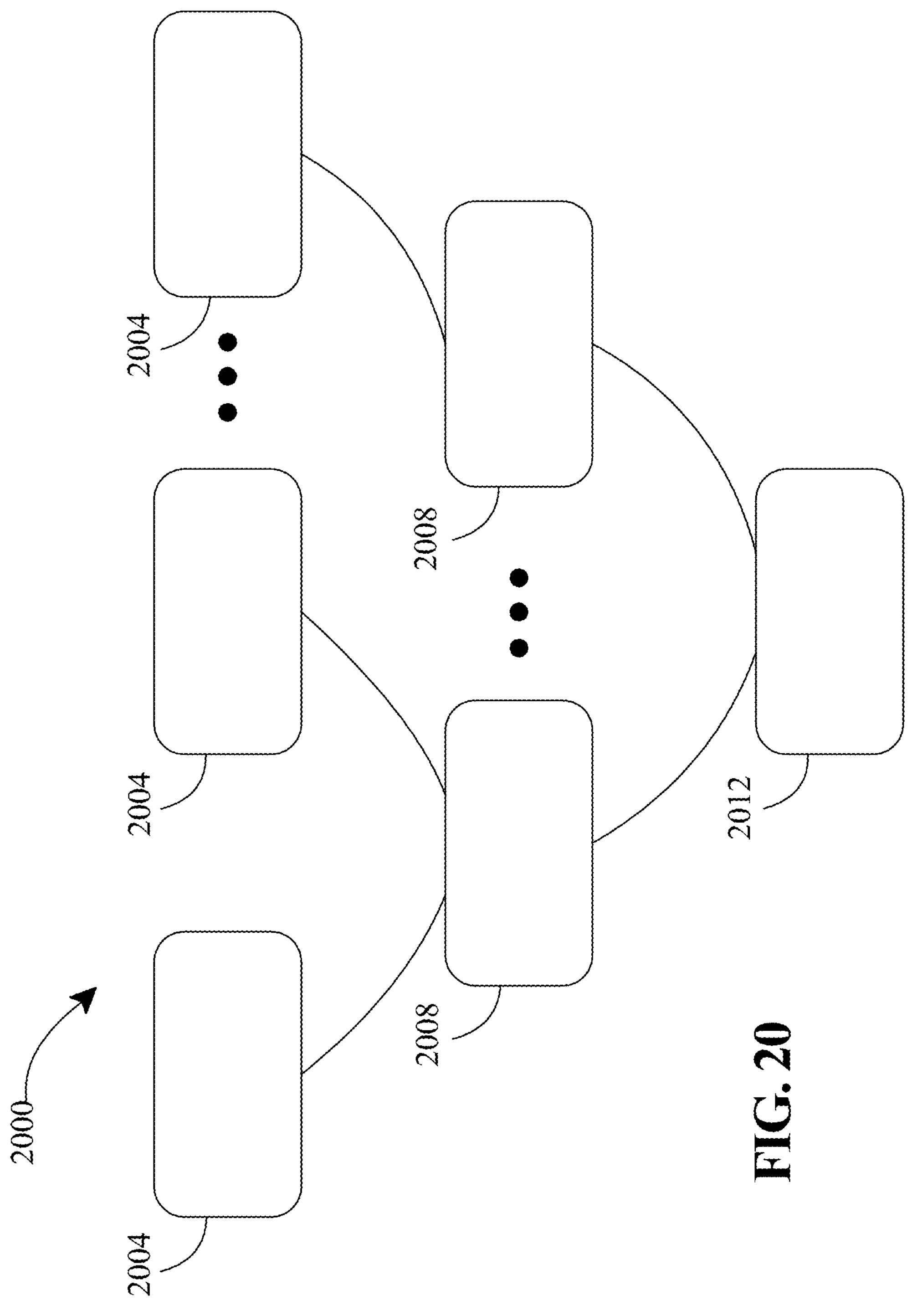
FIG. 20 is an exemplary embodiment of a cryptographic accumulator.

Referring now to FIG. 20, an exemplary embodiment of a cryptographic accumulator 2000 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 2000 has a plurality of accumulated elements 2004, each accumulated element 2004 generated from a lot of the plurality of data lots. Accumulated elements 2004 are create using an encryption process, defined for this purpose as a process that renders the lots of data unintelligible from the accumulated elements 2004; this may be a one-way process such as a cryptographic hashing process and/or a reversible process such as encryption. Cryptographic accumulator 2000 further includes structures and/or processes for conversion of accumulated elements 2004 to root 2012 element. For instance, and as illustrated for exemplary purposes in FIG. 8, cryptographic accumulator 2000 may be implemented as a Merkle tree and/or hash tree, in which each accumulated element 2004 created by cryptographically hashing a lot of data. Two or more accumulated elements 2004 may be hashed together in a further cryptographic hashing process to produce a node 2008 element; a plurality of node 2008 elements may be hashed together to form parent nodes 2008, and ultimately a set of nodes 2008 may be combined and cryptographically hashed to form root 2012. Contents of root 2012 may thus be determined by contents of nodes 2008 used to generate root 2012, and consequently by contents of accumulated elements 2004, which are determined by contents of lots used to generate accumulated elements 2004. As a result of collision resistance and avalanche effects of hashing algorithms, any change in any lot, accumulated element 2004, and/or node 2008 is virtually certain to cause a change in root 2012; thus, it may be computationally infeasible to modify any element of Merkle and/or hash tree without the modification being detectable as generating a different root 2012. In an embodiment, any accumulated element 2004 and/or all intervening nodes 2008 between accumulated element 2004 and root 2012 may be made available without revealing anything about a lot of data used to generate accumulated element 2004; lot of data may be kept secret and/or demonstrated with a secure proof as described below, preventing any unauthorized party from acquiring data in lot.

Alternatively, or additionally, and still referring to FIG. 20, cryptographic accumulator 2000 may include a "vector commitment" which may act as an accumulator in which an order of elements in set is preserved in its root 2012 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 2000 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 21:
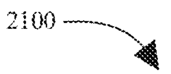
FIG. 21 is a flow diagram illustrating an exemplary method for NFC reading according to one exemplary embodiment.
Figure 21:
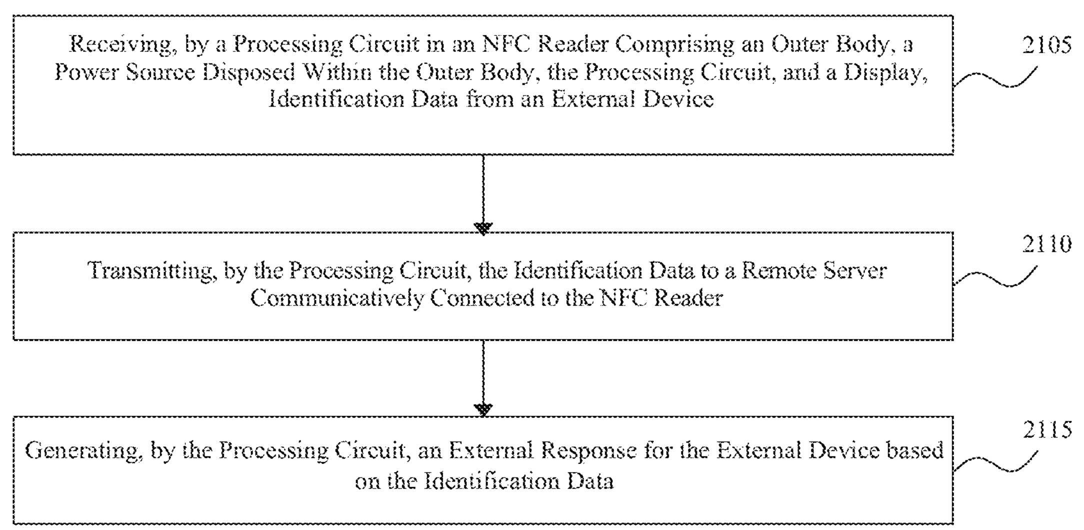

Referring now to FIG. 21, a flow diagram for a method 2100 for near field communication (NFC) reading is shown. Method 2100 includes a step 2105 of receiving, by a processing circuit in an NFC reader comprising an outer body, a power source disposed within the outer body, the processing circuit, and a display, identification data from an external device. In some embodiments, the identification data may comprise a unique identifier associated with the external device. These may be implemented, without limitation, as described above in reference to FIGS. 1-20.

With continued reference to FIG. 21, method 2100 includes a step 2110 of transmitting, by the processing circuit, the identification data to a remote server communicatively connected to the apparatus. This may be implemented, without limitation, as described above in reference to FIGS. 1-20.

With further reference to FIG. 21, method 2100 includes a step 2115 of generating, by the processing circuit, an external response for the external device based on the identification data. This may be implemented, without limitation, as described above in reference to FIGS. 1-20.

Continuing to reference FIG. 21, additionally, or alternative, method 2100 may include receiving, by the processing circuit, usage data associated with external devices. Further, in an embodiment, method 2100 may include receiving, by an ID reader, user identification data from a form of identification associated with a user. Additionally, or alternatively, method 900 may include storing, by the processing circuit, the user identification data and comparing, by the processing circuit the user identification data to a cutoff date. Further, additionally, or alternatively, method 900 may include generating the external response comprises generating the external response as a function of the comparison of the user identification data and the cutoff date. Furthermore, additionally, or alternatively, method 900 may include receiving, by the processing circuit, a user image of the user, comparing, by the processing circuit, the user identification data and the user image, and generating, by the processing circuit, the external response as a function of the comparison of the captured image of the form of identification associated and the user and the user image. This may be implemented, without limitation, as described above in reference to FIGS. 1-20.

Continuing to refer to FIG. 21, method 2100 may include transmitting, by the processing circuit, received identification data to remote server communicatively connected to the apparatus. Additionally, or alternatively, method 2100 may include storing, by the processing circuit, the identification data to a datastore. Further, in an embodiment, method 2100 may include generating, by the processing circuit, a user interface data structure as a function of the external response. This may be implemented, without limitation, as described above in reference to FIGS. 1-20.

With further reference to FIG. 21, additionally, or alternatively, method 2100 may include receiving, by the processing circuit, user metadata, transmitting, by the processing circuit, the user metadata to a digital identity verification platform, receiving, by the processing circuit, a verification datum from the digital identity verification generated based on verification of the user metadata, and generating, by the processing circuit, the external datum based on the verification datum. This may be implemented, without limitation, as described above in reference to FIGS. 1-20.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 22:
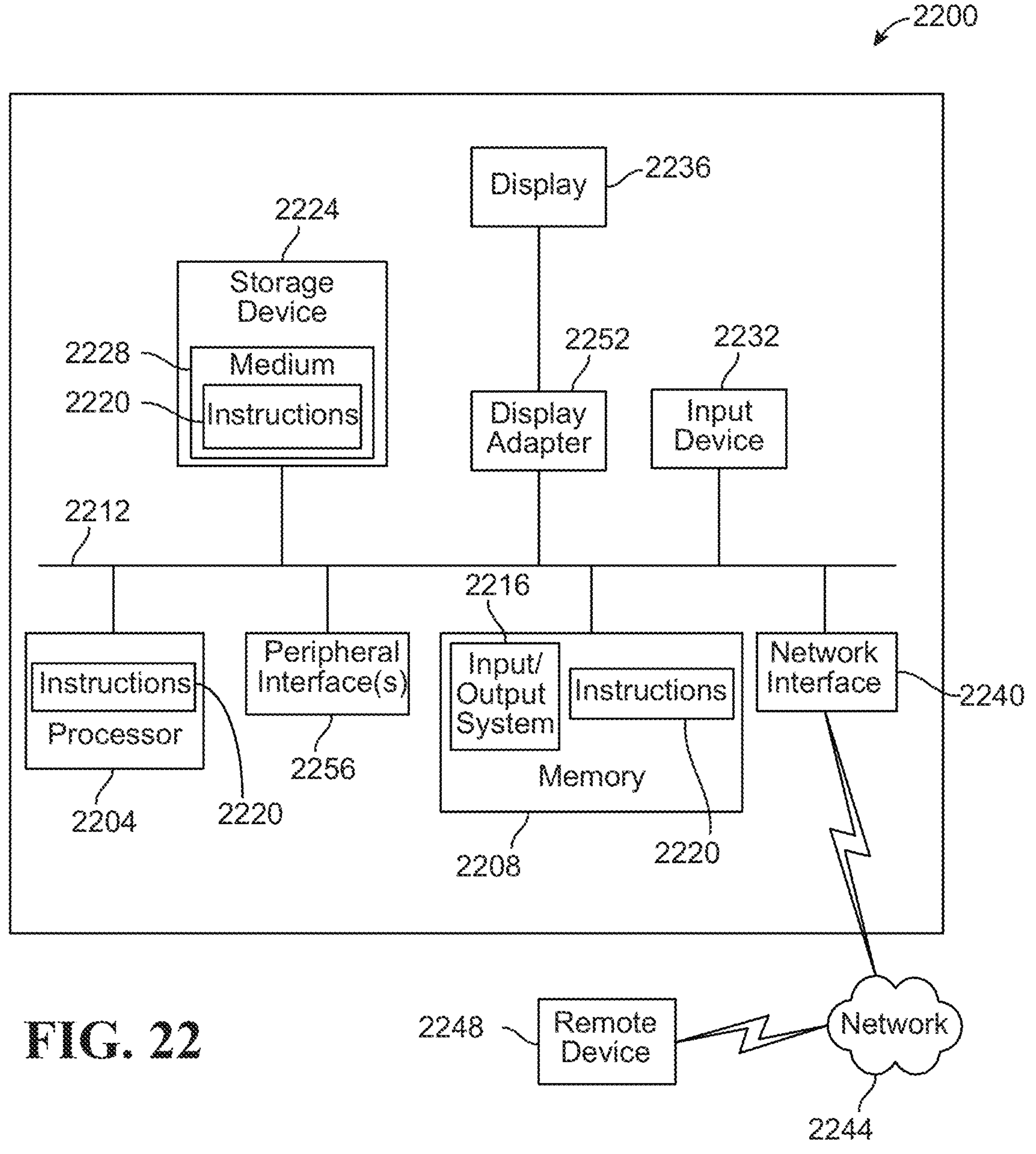
FIG. 22 is a block diagram of a computing system that can be used to implement any one or more of the methodologies disclosed herein and any one or more portions thereof.

FIG. 22 shows a diagrammatic representation of one embodiment of a computing device in the exemplary form of a computer system 2200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2200 includes a processor 2204 and a memory 2208 that communicate with each other, and with other components, via a bus 2212. Bus 2212 may include any of several types of bus structures including, but not limited to, a memory bus, a memory controller, a peripheral bus, a local bus, and any combinations thereof, using any of a variety of bus architectures.

Processor 2204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 2204 may be organized according to Von Neumann and/or Harvard architecture as a non-limiting example. Processor 2204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 2208 may include various components (e.g., machine-readable media) including, but not limited to, a random-access memory component, a read only component, and any combinations thereof. In one example, a basic input/output system 2216 (BIOS), including basic routines that help to transfer information between elements within computer system 2200, such as during start-up, may be stored in memory 2208. Memory 2208 may also include (e.g., stored on one or more machine-readable media) instructions (e.g., software) 2220 embodying any one or more of the aspects and/or methodologies of the present disclosure. In another example, memory 2208 may further include any number of program modules including, but not limited to, an operating system, one or more application programs, other program modules, program data, and any combinations thereof.

Computer system 2200 may also include a storage device 2224. Examples of a storage device (e.g., storage device 2224) include, but are not limited to, a hard disk drive, a magnetic disk drive, an optical disc drive in combination with an optical medium, a solid-state memory device, and any combinations thereof. Storage device 2224 may be connected to bus 2212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2224 (or one or more components thereof) may be removably interfaced with computer system 2200 (e.g., via an external port connector (not shown)). Particularly, storage device 2224 and an associated machine-readable medium 2228 may provide nonvolatile and/or volatile storage of machine-readable instructions, data structures, program modules, and/or other data for computer system 2200. In one example, software 2220 may reside, completely or partially, within machine-readable medium 2228. In another example, software 2220 may reside, completely or partially, within processor 2204.

Computer system 2200 may also include an input device 2232. In one example, a user of computer system 2200 may enter commands and/or other information into computer system 2200 via input device 2232. Examples of an input device 2232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2232 may be interfaced to bus 2212 via any of a variety of interfaces (not shown) including, but not limited to, a serial interface, a parallel interface, a game port, a USB interface, a FIREWIRE interface, a direct interface to bus 2212, and any combinations thereof. Input device 2232 may include a touch screen interface that may be a part of or separate from display 2236, discussed further below. Input device 2232 may be utilized as a user selection device for selecting one or more graphical representations in a graphical interface as described above.

A user may also input commands and/or other information to computer system 2200 via storage device 2224 (e.g., a removable disk drive, a flash drive, etc.) and/or network interface device 2240. A network interface device, such as network interface device 2240, may be utilized for connecting computer system 2200 to one or more of a variety of networks, such as network 2244, and one or more remote devices 2248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2244, may employ a wired and/or a wireless mode of communication. In general, any network topology may be used. Information (e.g., data, software 2220, etc.) may be communicated to and/or from computer system 2200 via network interface device 2240.

Computer system 2200 may further include a video display adapter 2252 for communicating a displayable image to a display device, such as display 2236. Examples of a display device include, but are not limited to, a liquid crystal display (LCD), a cathode ray tube (CRT), a plasma display, a light emitting diode (LED) display, and any combinations thereof. Display adapter 2252 and display 2236 may be utilized in combination with processor 2204 to provide graphical representations of aspects of the present disclosure. In addition to a display device, computer system 2200 may include one or more other peripheral output devices including, but not limited to, an audio speaker, a printer, and any combinations thereof. Such peripheral output devices may be connected to bus 2212 via a peripheral interface 2256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. An apparatus for near field communication (NFC) reading, comprising:

an outer body;

a power source disposed within the outer body, wherein the power source is configured to provide electric power;

an ID reader configured to receive user metadata from a form of identification associated with a user, the user metadata comprising a birthday data;

a processing circuit connected to the power source to provide power to the processing circuit; and a display communicatively connected to the processing circuit, wherein the processing circuit is configured to:

receive identification data from an aerosol delivery device, receive the user metadata from the ID reader;

store the birthday data and compare the birthday data to a cutoff date; and generate an external response for the aerosol delivery device as a function of the comparison of the birthday data and the cutoff date, wherein the apparatus for NFC reading is an NFC reader integrated into a point of sale system, and wherein the identification data is configured to uniquely identify the aerosol delivery device.

2. The apparatus of claim 1, wherein the identification data comprises a unique identifier associated with the aerosol delivery device.

3. The apparatus of claim 1, wherein the external response consists of instructions to unlock the aerosol delivery device.

4. The apparatus of claim 1, wherein processing circuit is further configured to:

receive a user image of the user, compare the user metadata and the user image, and generate the external response as a function of the comparison of the user metadata and the user image.

5. The apparatus of claim 1, wherein the processing circuit is further configured to transmit the identification data to a remote server communicatively connected to the apparatus.

6. The apparatus of claim 1, wherein the processing circuit is further configured to generate a timestamp corresponding to a time when the aerosol delivery device is purchased by the user.

7. The apparatus of claim 6, wherein the processing circuit is further configured to transmit the timestamp and the identification data to a remote server communicatively connected to the apparatus.

8. The apparatus of claim 1, wherein the processing circuit is further configured to store the identification data to a datastore.

9. The apparatus of claim 1, wherein the processing circuit is further configured to generate a user interface data structure as a function of at least one of the external response or the identification data.

10. A method for near field communication (NFC) reading, comprising:

providing an NFC reader comprising an outer body, a power source disposed within the outer body, a display, an ID reader, and a processing circuit;

collecting user metadata comprising birthday data, using the ID reader;

receiving, by the processing circuit, identification data from an aerosol delivery device;

receiving, by the processing circuit, the user metadata from the ID reader;

storing the birthday data;

comparing, by the processing circuit, the birthday data to a cutoff date; and generating an external response for the aerosol delivery device based on the comparison of the birthday data and the cutoff date.

11. The method of claim 10, wherein the identification data comprises a unique identifier associated with the aerosol delivery device.

12. The method of claim 10, further comprising:

receiving, by the processing circuit, a user image of the user, comparing, by the processing circuit, the user metadata and the user image; and generating, by the processing circuit, the external response as a function of the comparison of the user metadata and the user image.

13. The method of claim 10, further comprising generating a timestamp corresponding to a time when the aerosol delivery device is purchased by the user.

14. The method of claim 13, further comprising transmitting the timestamp and the identification data to a remote server communicatively connected to the apparatus.

15. The method of claim 10, further comprising storing, by the processing circuit, the identification data to a datastore.

16. The method of claim 10, further comprising generating, by the processing circuit, a user interface data structure as a function of at least one of the external response or the identification data.

17. The method of claim 10, wherein the external response consists of instructions to unlock the aerosol delivery device.

18. The method of claim 16, further comprising receiving, via the processing circuit, a usage data associated with the aerosol delivery device.

19. The method of claim 18, further comprising displaying on the display at least one of the identification data, the external response, or the usage data.

20. The apparatus of claim 1, wherein the ID reader comprises an optical sensor configured to capture a photo of at least one of the user or the birthday data displayed on an ID of the user.

* * * * *